United States Patent
Wilkinson et al.

(10) Patent No.: US 10,523,796 B2
(45) Date of Patent: Dec. 31, 2019

(54) TECHNIQUES FOR EMBEDDING FABRIC ADDRESS INFORMATION INTO LOCALLY-ADMINISTERED ETHERNET MEDIA ACCESS CONTROL ADDRESSES (MACS) AND A MULTI-NODE FABRIC SYSTEM IMPLEMENTING THE SAME

(71) Applicant: Intel Corporation, Santa Clara, CA (US)

(72) Inventors: Hugh Wilkinson, Newton, MA (US); James C. Wright, Sewell, NJ (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 14/979,179

(22) Filed: Dec. 22, 2015

(65) Prior Publication Data
US 2017/0180271 A1    Jun. 22, 2017

(51) Int. Cl.
*H04L 12/947* (2013.01)
*H04L 12/933* (2013.01)
(Continued)

(52) U.S. Cl.
CPC .......... *H04L 69/22* (2013.01); *H04L 12/4633* (2013.01); *H04L 45/66* (2013.01);
(Continued)

(58) Field of Classification Search
CPC ....... H04L 49/25; H04L 49/10; H04L 61/103; H04L 61/6022; H04L 69/22
(Continued)

(56) References Cited

U.S. PATENT DOCUMENTS

2002/0018481 A1*  2/2002  Mor ............... H04L 12/423
                                                    370/403
2004/0213220 A1* 10/2004  Davis ............ H04L 12/4604
                                                    370/389
(Continued)

FOREIGN PATENT DOCUMENTS

KR   10-2011-0125662 A   11/2011

OTHER PUBLICATIONS

Title: "Using FabricPath" Publisher/Author: Cisco Date: Sep. 20, 2013 pp. 2 & 6.*
(Continued)

*Primary Examiner* — Ricky Q Ngo
*Assistant Examiner* — Ellen A Kirillova
(74) *Attorney, Agent, or Firm* — Grossman, Tucker, Perreault & Pfleger, PLLC

(57) ABSTRACT

Techniques for embedding fabric addressing information within Ethernet media access control (MAC) addresses is disclosed herein and allows a multi-node fabric having potentially millions of nodes to feature Ethernet encapsulation without the necessity of a lookup or map to translate MAC addresses to fabric-routable local identifiers (LIDs). In particular, a locally-administered MAC address may be encoded with fabric addressing information including a LID. Thus a node may exchange Ethernet packets using a multi-node fabric by encapsulating each Ethernet packet with a destination MAC address corresponding to an intended destination. As the destination MAC address may implicitly map to a LID of the multi-node fabric, the node may use an extracted LID value therefrom to address a fabric-routable packet. To this end, a node may introduce a fabric-routable packet encapsulating an Ethernet packet onto a multi-node fabric without necessarily performing a lookup to map a MAC address to a corresponding LID.

21 Claims, 17 Drawing Sheets

(51) Int. Cl.
   *H04L 29/06*   (2006.01)
   *H04L 29/12*   (2006.01)
   *H04L 12/931*  (2013.01)
   *H04L 12/46*   (2006.01)
   *H04L 12/721*  (2013.01)
   *H04L 12/937*  (2013.01)

(52) U.S. Cl.
   CPC .......... *H04L 49/253* (2013.01); *H04L 49/351* (2013.01); *H04L 49/70* (2013.01); *H04L 61/103* (2013.01); *H04L 61/6022* (2013.01)

(58) Field of Classification Search
   USPC .......................................................... 370/329
   See application file for complete search history.

(56) References Cited

U.S. PATENT DOCUMENTS

| | | | | |
|---|---|---|---|---|
| 2009/0141727 | A1* | 6/2009 | Brown | H04L 12/4633 370/395.31 |
| 2011/0320619 | A1 | 12/2011 | Kolbe et al. | |
| 2012/0243539 | A1* | 9/2012 | Keesara | H04L 45/66 370/392 |
| 2013/0246606 | A1* | 9/2013 | Branch | H04L 41/0853 709/224 |
| 2014/0068088 | A1* | 3/2014 | Krishnan | H04L 61/2038 709/227 |
| 2014/0079065 | A1 | 3/2014 | Davis | |
| 2014/0226659 | A1* | 8/2014 | Tsirkin | H04L 45/74 370/390 |
| 2014/0348007 | A1 | 11/2014 | Beecroft | |
| 2015/0063353 | A1* | 3/2015 | Kapadia | H04L 45/745 370/392 |
| 2015/0071113 | A1* | 3/2015 | Davis | H04L 45/60 370/254 |
| 2015/0222533 | A1 | 8/2015 | Birrittella et al. | |
| 2015/0319088 | A1* | 11/2015 | Wenig | H04L 45/745 370/392 |
| 2015/0334034 | A1* | 11/2015 | Smedley | H04L 49/10 709/219 |
| 2016/0006656 | A1* | 1/2016 | Yan | H04L 45/306 370/392 |
| 2016/0014241 | A1* | 1/2016 | Tai | H04L 12/4633 370/474 |
| 2016/0036703 | A1* | 2/2016 | Josyula | H04L 45/66 370/392 |
| 2016/0142313 | A1* | 5/2016 | Devireddy | H04L 49/70 370/392 |

OTHER PUBLICATIONS

Title: "802.3 At 10Mbps" Publisher/Author: Lewis Date: Sep. 24, 2014.*
Wikipedia; "DECnet"; https://en.wikipedia.org/wiki/DECnet; Dec. 15, 2015; 4 pages.
Wikipedia; "Internetwork Packet Exchange"; https://en.wikipedia.org/wiki/Internetwork_Packet_Exchange; Aug. 12, 2015, 6 pages.
International Search Report and Written Opinion issued in PCT Application No. PCT/US2016/06330, dated Feb. 24, 2017, 13 pages.
International Preliminary Report on Patentability issued in PCT Application No. PCT/US2016/06330, dated Jul. 5, 2018, 10 pages.

* cited by examiner

TECHNIQUES FOR EMBEDDING FABRIC ADDRESS INFORMATION INTO LOCALLY-ADMINISTERED ETHERNET MEDIA ACCESS CONTROL ADDRESSES (MACS) AND A MULTI-NODE FABRIC SYSTEM IMPLEMENTING THE SAME

FIELD

The present disclosure is generally directed to communication between nodes of a multi-node network or fabric, and more particularly, to encoding fabric address information into Ethernet media access control (MAC) addresses to allow virtualized Ethernet networks within multi-node fabric systems.

BACKGROUND

The use of a large number of multi-core processors combined with centralization techniques continue to increase in popularity for applications that feature computationally intensive tasks. For example, systems implemented with a large number of compute nodes disposed in proximity to each other, and coupled via high-speed interconnects, are particularly well suited for applications such as quantum mechanics, weather forecasting, climate research, oil and gas exploration, and molecular modeling, just to name a few. These multi-node systems may provide processing capacity many orders of magnitude greater than that of a single computer. This gap grows exponentially each year. For example, some multi-node systems have processing capacity (generally rated by floating pointing operations per second (FLOP)), in the petaflops range.

This pursuit of increased performance has led to approaches including massively parallel systems featuring a large number of compute nodes, with each node providing one or more processors, memory, and an interface circuit connecting the node to a multi-node network. The processing capacity of a given multi-node network can scale based on adding additional nodes. However, as multi-node systems approach exascale, or a billion billion calculations per second, the complexity of addressing large numbers of nodes raises numerous non-trivial challenges.

Figure 1:
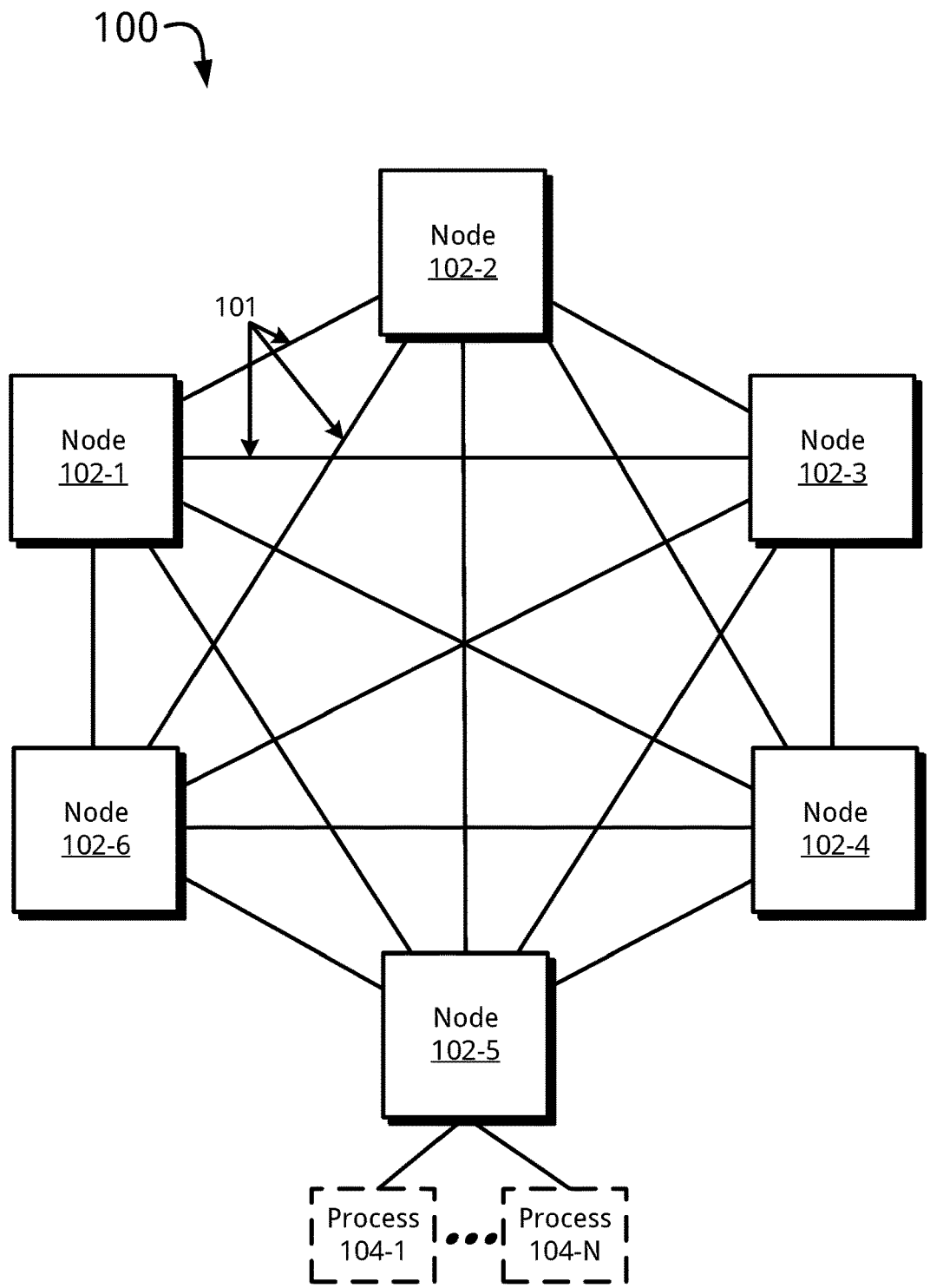
FIG. 1 is a block diagram of an example multi-node network or fabric having a plurality of interconnected nodes, in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

High Performance Computing (HPC) applications may be implemented across a number of inter-connected compute nodes. The inter-connected nodes may form a so-called "fabric" whereby each node is communicatively coupled to every other node via a network. In an embodiment, inter-node communication may occur during performance of an HPC application. Inter-node communication may include a source node sending a sequence of packets to a destination node. The sequence of packets may be associated with, for example, gets or sets which seek to read or write to memory associated with the target node. Each packet may comport with a light-weight, fabric-routable format designed to allow efficient layer 2 (L2) switching from the source node to the destination node.

In some scenarios, nodes may seek to exchange Ethernet packets with other nodes of the same multi-node fabric, nodes of a remote multi-node fabric, or with nodes of an external Ethernet network. Ethernet has enjoyed wide-scale adoption since its standardization in 1980 by the IEEE 802 LAN/MAN Standards Committee, and more specifically the 802.3 Working Group. In a general sense, Ethernet provides a widely understood, well-developed standard for communicating between two or more computer systems. To accommodate Ethernet connectivity, some approaches to multi-node fabrics allow Ethernet communication by encapsulating Ethernet packets within fabric-routable packets. Encapsulation within this context necessitates mapping/translating of Ethernet MAC addresses to an addressing scheme that comports with a given multi-node fabric. For example, some multi-node fabric systems may uniquely address each node by assigning a local identifier or LID. To this end, a node may have a unique LID within a particular multi-node fabric, but not a globally-unique LID amongst a plurality of multi-node fabric systems. In any event, some approaches to Ethernet encapsulation map Ethernet MAC addresses to LIDs via, for example, a lookup table wherein the MAC address is used as a lookup key and the LID is the corresponding value. However, some multi-node fabric implementations feature node configurations with at least one (1) million nodes, or more. Thus table-based approaches, even when implemented within content address memory (CAM) devices, may introduce significant latencies and consume considerable amounts of node resources in large-scale multi-node fabric configurations.

Thus, in accordance with an embodiment of the present disclosure, techniques for embedding fabric addressing information within Ethernet MAC addresses is disclosed and may allow a multi-node fabric having potentially millions of compute nodes to feature Ethernet encapsulation without the necessity of a lookup table or other map to translate MAC addresses to fabric-routable LIDs. In more detail, the Ethernet standard (e.g., IEEE 802) defines multiple MAC address classes, including a class known as "locally-administered," that allows the addresses to be assigned by, for example, a local network administrator. This particular class of MAC address enables up to 46 bits of unused or otherwise unassigned bits of data to be encoded with user-defined information. Thus, and in accordance with an embodiment, a locally-administered MAC address may be encoded with fabric addressing information including a LID. In some cases, the remaining bits may further include an encoded fabric identifier (FabricID) and virtual Ethernet switch ID (vESWID). As should be appreciated, globally-administered MAC addresses are also within the scope of this disclosure.

In one specific example embodiment, each node of the multi-node network may be assigned a locally-administered MAC address. For example, a given node may be assigned a locally-administered MAC address based on its particular LID, and further based on its association with a particular multi-node fabric and virtual Ethernet switch overlaid onto and serviced by the particular multi-node fabric. Thus the node may exchange Ethernet packets using a given multi-node fabric by encapsulating each Ethernet packet with a destination MAC address corresponding to an intended destination. Because the destination MAC address may implicitly map to a LID of the multi-node fabric, e.g., based on a LID encoded therein, the node may use an extracted LID value therefrom to address a fabric-routable packet. To this end, a node may introduce a fabric-routable packet encapsulating an Ethernet packet onto a multi-node fabric without necessarily performing a lookup to map a destination MAC address to a corresponding LID.

In an embodiment, methods are disclosed herein that may utilize hardware, software, or a combination thereof, to perform Ethernet encapsulation and de-encapsulation routines. For example, a node may be configured with a virtual network interface (vNIC) that behaves similar to a standard Ethernet adapter such that a process may initiate sending and receiving of multicast or unicast Ethernet packets therefrom. The virtual network interface card may work in combination with a virtual Ethernet switch port (vESWPort) that is configured to perform Ethernet packet encapsulation and de-encapsulation. A fabric interface circuit may then be utilized by the vESWPort to transmit and receive fabric-routable packets that include encapsulated Ethernet packets. The techniques for Ethernet encapsulation disclosed herein may support transmission of, for example, IPv4, IPv6, TCP, UDP, or any combination thereof. Further, within the context of TCP or UDP, the multi-fabric disclosed may support out-of-order delivery, and allow an end-node to recover the original order of packets.

Each vESWPort may be generally understood to function similar to that of a port on a standard Ethernet switch. To this end, a multi-node fabric may provide one or more virtual Ethernet switches overlaid onto the multi-node fabric, with each vESWPort being associated with a particular virtual Ethernet switch based on an assigned virtual Ethernet switch identifier (vESWID). In some cases, each node within a multi-node fabric may be associated with a single virtual Ethernet switch. Thus the single virtual Ethernet switch may exchange packets directly between associated nodes. In other cases, two or more virtual Ethernet switches may be present within a same multi-node fabric. In these cases, each virtual Ethernet switch may operate essentially as an independent virtual Ethernet network. This virtualized Ethernet architecture may be understood to share some characteristics with VLANs which provide isolation between two or more Ethernet networks that share one or more switching devices. To this end, the Ethernet encapsulation and de-encapsulation routines manifest an appreciation that a destination for an Ethernet packet may not reside within a same virtual Ethernet network, e.g., based on a source node's assigned vESWID. Moreover, the destination for an Ethernet packet may not reside within the same multi-node fabric, e.g., based on a source node's assigned FabricID. Thus the techniques for encoding fabric addressing information into MAC addresses may encode fabric addressing parameters into each MAC address to account for such scenarios.

Numerous advantages will be apparent in light of this disclosure versus other approaches to Ethernet encapsulation over multi-node fabric systems. For example, as a multi-node fabric system scales with the addition of nodes, Ethernet connectivity may scale at the same rate (e.g., 1:1) due to the lack of a look-up table that would otherwise limit Ethernet scalability. In addition, millions of nodes (e.g., up to 16 million or more) may subscribe to a single virtual Ethernet switch.

While specific references are made to HPC applications, this disclosure is not intended to be limited in this regard. For example, nodes may comprise standard computer systems, such as server computers commercially available for non-HPC applications (e.g., data storage, email servers, domain controllers, etc.). Thus, the multi-node network may not necessarily comprise a so-called "super computer" configured with ultra-high performance computing nodes. In addition, both general-purpose data center applications and specific-purpose data center applications are within the scope of this disclosure. For example, general-purpose data centers generally include infrastructure that supports a single business with a broad variety of applications, or an information technology (IT) service provider servicing many customers. On the other hand, specific-purpose data centers generally include university and military research, scientific laboratories, financial institutions, and search engine providers, just to name a few. Specific-purpose data centers generally implement specific usage patterns and are well suited for highly-scalable architecture that is tailored for a single or otherwise limited number of purposes. In any such cases, the techniques for Ethernet encapsulation using fabric addressing information encoded into MAC addresses are equally applicable to both general-purpose and specific-purpose data center applications. As generally referred to herein, the term "fabric-routable" generally refers to a packet that may be routed end-to-end via a multi-node fabric using, for example, networking equipment (e.g., switches, routers, etc.) configured to perform layer 2 (L2) switching.

Example Multi-Node Fabric System and Architecture

Now referring to the figures, FIG. 1 shows a multi-node fabric 100 or network in accordance with an embodiment of the present disclosure. As shown, each of the nodes 102-1 to 102-6 nodes are communicatively coupled to each other via paths 101 or links. The multi-node fabric 100 may also be accurately referred to as a fabric system having an all-to-all configuration whereby each node has a node path to all other nodes. As should be appreciated, the multi-node fabric 100 is illustrated in a highly simplified form. Other node topologies are within the scope of this disclosure and the example embodiment of FIG. 1 is not intended to be limiting. The multi-node fabric 100 may include N number of nodes and is not necessarily limited to six nodes, as shown. For example, the multi-node fabric 100 may include up to 1 million nodes, or more, depending on a desired configuration.

In an embodiment, each of the paths 101 may include associated networking switching equipment such as network switches, routers, and other high-speed interconnects. For example, the paths 101 may form a switched-fabric or switching-fabric network topology in which each node is communicatively coupled to the multi-node fabric 100 via one or more network switches. Alternatively, or in addition to switched-fabric, one or more paths may also physically manifest as a data bus, such as a PCI Express data bus or a proprietary data bus implemented by, for example, a backplane that couples two or more nodes. In one specific example not meant to limit the present disclosure, one or more of the paths 101 may comprise high-bandwidth interconnects such as 10 Gigabit InfiniBand interconnects. In any event, the multi-node fabric 100 may spread network traffic across multiple physical links represented by each of paths 101, which may yield throughput that exceeds that of other network approaches, such as broadcast networks implementing Ethernet.

Figure 9:
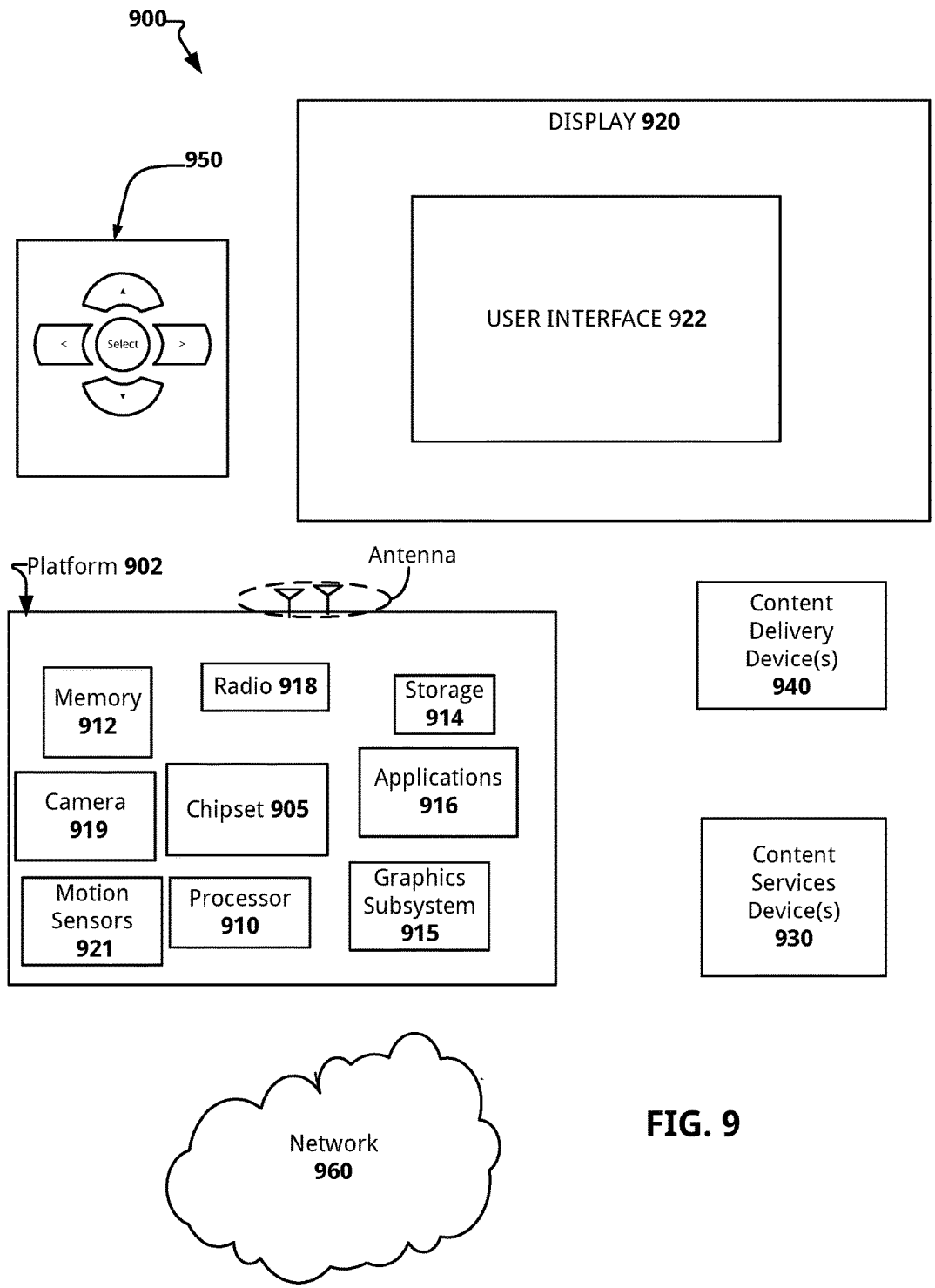
FIG. 9 illustrates a computer system configured to perform various processes disclosed herein, in accordance with an example embodiment of the present disclosure.

In an embodiment, each of the nodes 102-1 to 102-6 may comprise a computing system, such as the computing system 900 of FIG. 9. Each of the nodes 102-1 to 102-6 may comprise the same hardware and operating system, although different operating systems may be used on each node, and/or on different hardware. In some cases, one or more nodes may comprise a single-board or small form-factor (SFF) compute device enabling high-density applications. For example, datacenters may choose these types of compute nodes to maximize or otherwise increase the ratio of processors/cores per rack unit (U) of rack space.

Figure 2:
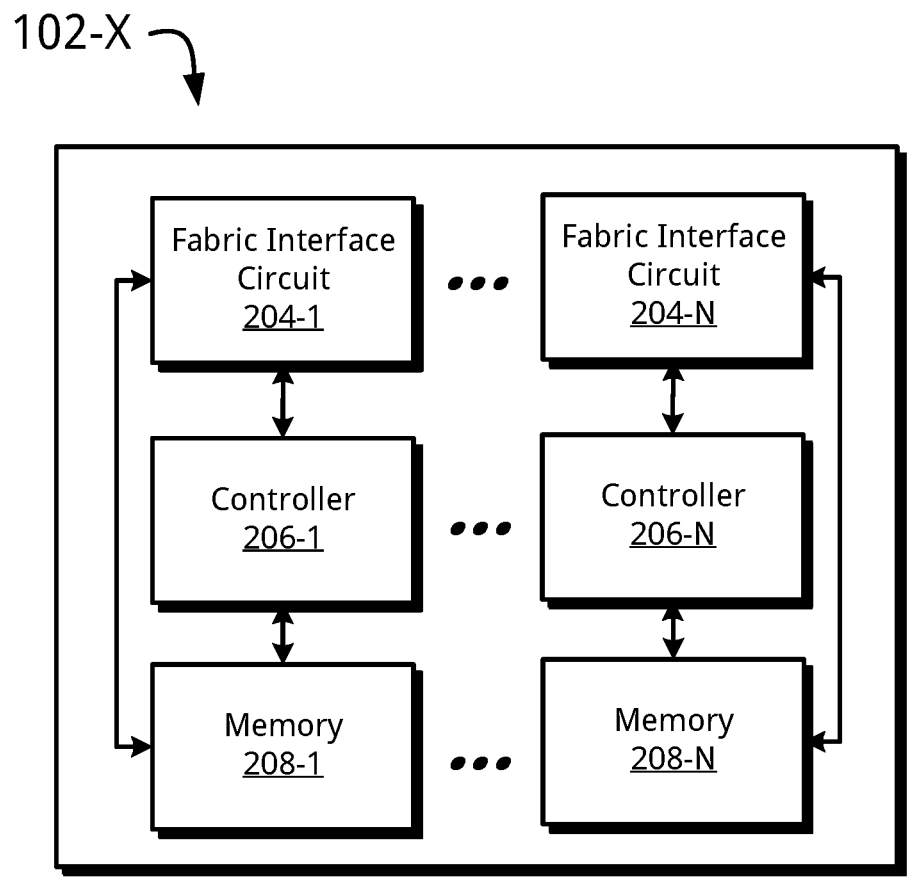
FIG. 2 is a block diagram of an example node of the multi-node network of FIG. 1, in accordance with an embodiment of the present disclosure.

Referring to FIG. 2, a block diagram illustrates an example node 102-X compatible for use as a node of the multi-node fabric 100 of FIG. 1, in accordance with an embodiment of the present disclosure. As shown, the example node 102-X comprises at least one fabric interface circuit 204-1 to 204-N or network interface circuit, controller 206-1 to 206-N, and memory device 208-1 to 208-N. In an embodiment, the example node 102-X comprises a single system-on-chip (SoC) device, although other embodiments are within the scope of this disclosure. For example, each component of the example node 102-X may comprise a separate chip.

In more detail, each fabric interface circuit 204-1 to 204-N may be communicatively coupled to a respective one of controllers 206-1 to 206-N, and to a respective one of memory devices 208-1 to 208-N. The fabric interface circuits 204-1 to 204-N may each comprise hardware, software, or both, configured to transmit and receive signals using various communication techniques. For example, each fabric interface circuit 204-1 to 204-N may be configured to provide electrical signaling, optical signaling, or both, between nodes of the multi-node fabric 100. In any such cases, each fabric interface circuit 204-1 to 204-N may be configured to provide a plurality of bi-directional network ports with each providing up/down speeds of about 12.5 gigabytes (GB) per second, for example, although other link speeds are within the scope of this disclosure.

Each of the fabric interface circuits 204-1 to 204-N may include at least one processing device/circuit (not shown) such as, for example, a field-programmable gate array (FPGA), Reduced Instruction Set Computer (RISC) processor, x86 instruction set processor, microcontroller, an application-specific integrated circuit (ASIC). To this end, each of the fabric interface circuits 204-1 to 204-N may be configured to execute a plurality of instructions to carry out processes in accordance with various aspects and embodiments disclosed herein. For example, the processing device of the fabric interface circuit may be configured to execute the methods of FIGS. 5A-5C and 6. These processes may be may be implemented, for example, using software (e.g., C or C++ executing on the controller/processor), hardware (e.g., hardcoded gate level logic or purpose-built silicon) or firmware (e.g., embedded routines executing on a microcontroller), or any combination thereof.

As shown, each of the fabric interface circuits 204-1 to 204-N communicatively couples to a respective one of controllers 206-1 to 206-N, and to a respective one of the memory devices 208-1 to 208-N. In an embodiment, this coupling may physically manifest as a high-speed serial data bus, such as a PCI-E serial bus, although numerous other communication techniques should be apparent in light of this disclosure. Each fabric interface circuit 204-1 to 204-N may be configured to perform direct memory access (DMA) on an associated memory device.

As should be appreciated, each of the fabric interface circuits 204-1 to 204-N may be optionally coupled directly or indirectly to each other for intra-node communication. For example, each of the fabric interface circuits 204-1 to 204-N may be directly coupled to each other such that intra-node messages are routed without utilizing fabric hardware (e.g., network switches, routers, and so on) of the multi-node fabric 100. On the other hand, each of the fabric interface circuits 204-1 to 204-N may be indirectly coupled to each other using a router device (not shown), which may intelligently direct intra-communications of the example node 102-X to an appropriate fabric interface circuit. Within the context of the multi-node fabric 100, packet forwarding may be handled at the link layer (e.g., L2). Thus each fabric interface circuit 204-1 to 204-N may be uniquely identified via a local identifier (LID), which in some cases may comprise a 16-bit value assigned by a Fabric Manager node (not shown) coupled to the multi-node fabric 100. Link-level switching may forward packets to the particular node specified by a destination LID within, for instance, a header portion of each fabric-routable packet. Each fabric interface circuit 204-1 to 204-N may also be accurately referred to as a host-fabric interface (HFI).

Each controller 206-1 to 206-N may include at least one processing device/circuit, but other embodiments are also within the scope of this disclosure. For example, each controller 206-1 to 206-N may comprise at least two processing devices. Some example processing devices include, for example, a Complex Instruction Set Computer (CISC), a field-programmable gate array (FPGA), Reduced Instruction Set Computer (RISC) processor, x86 instruction set processor, microcontroller, an application-specific integrated circuit (ASIC), a graphics processing unit (GPU), or central processing unit (CPU). In some cases, each processing device provides at least one processing core. For example, and in accordance with an embodiment, each processing device may comprise a multi-core processor configured to provide at least 16 processing cores. In some cases, each of the controllers 206-1 to 206-N is configured with the same hardware, although other embodiments are also within the scope of this disclosure. In any event, each of the controllers 206-1 to 206-N may include or otherwise receive instructions that when executed cause one or more processes to be carried out, such as processes comprising the methods of FIGS. 5A-5C and 6.

Each memory device 208-1 to 208-N may comprise, for example, a non-volatile storage device including flash memory and/or volatile storage devices such as Random Access Memory (RAM), content addressable memory (CAM) device, Dynamic Random Access Memory (DRAM), and Static Ram (SRAM).

Figure 3A:
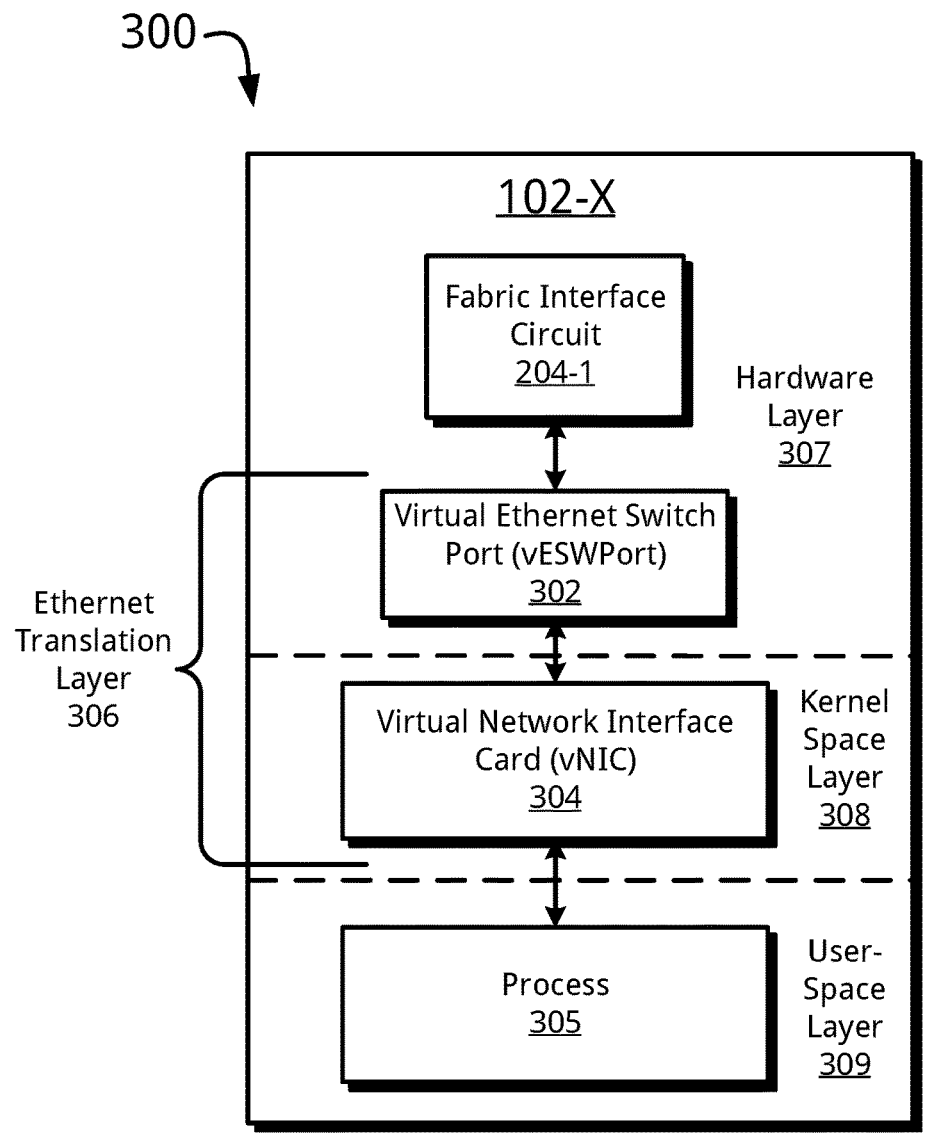
FIG. 3A is a block diagram that illustrates additional aspects of the architecture of the example node of FIG. 2 in further detail, in accordance with an embodiment of the present disclosure.

Referring to FIG. 3A, a block diagram illustrates additional aspects of an architecture 300 of the example node 102-X in further detail, in accordance with an embodiment of the present disclosure. As should be appreciated, the architecture 300 of the example node 102-X is shown in a highly-simplified form. As shown, the architecture includes a plurality of layers including a hardware layer 307, a kernel space layer 308, and a user-space layer 309. Each respective layer will now be discussed in turn.

The hardware layer 307 may comprise a fabric interface circuit 204-1 and a virtual Ethernet switch port (vESWPort) 302. The vESWPort 302 may not necessarily comprise separate hardware and may, for example, reside within kernel space 308 of the node 102-X. The vESWPort 302 may be configured to perform encapsulation and de-encapsulation of Ethernet packets so that they may be routed via the multi-node network, as discussed further below with reference to FIGS. 5A-5C and 6. The vESWPort 302 may be configured with a predefined fabric identifier (fabricID), a virtual Ethernet switch identifier (vESWID), and a local identifier (LID). The LID may uniquely address a node, and more specifically, a fabric interface circuit of the node within the multi-node fabric, with the multi-node fabric being identified by the fabric identifier fabricID. In some cases, a node may include two or more fabric interface circuits, such as depicted in FIG. 2. To this end, the vESWPort may include a locally-administered media access control (MAC) address, with the MAC address encoding at least a LID. In some cases, such as shown in FIG. 4F, the MAC address may also encode the predefined fabricID and/or the vESWID, in addition to the LID. In an embodiment, the MAC address is set by, for example, a network administrator or other user of the node 102-X. Alternatively, or in addition to a user-defined MAC address, an Ethernet virtual switch manager 110 (FIG. 4A) may assign one or more MAC addresses.

The kernel space layer 308 may comprise a virtual network interface card vNIC 304. The vNIC 304 may be configured to pass Ethernet packets to and from the multi-node fabric 100 through the vESWPort 302. As should be appreciated, the fabric interface circuit 204-1 may be configured to support multiple vNIC 304/vESWPort 302 interfaces, and is not necessarily limited to 1:1, as shown. The vNIC 304 may be configured to inherit the predefined locally-administered MAC address of the associated vESWPort 302. The vNIC 304 may be understood to be a standard Ethernet adapter insofar as the vNIC 304 can be configured to accept specific MAC addresses as valid source and destination addresses. In a more general sense, the vNIC 304 is the "visible" network interface seen by a process executed in user-space memory, such as the process 305. Thus the vNIC 304 may provide an interface whereby the process 305 may request packets to be sent to an Ethernet-based destination address, and whereby the process 305 may receive Ethernet packets/frames directed to the process 305 within user space.

The process 305 may comprise, for example, any process executed in the user-space layer 309 which seeks to communicate with remote computing devices via Ethernet packets. The process 305 may be implemented in, for example, C++ and invoke standard operating system calls (e.g., sockets) to cause Ethernet communication to occur via the vNIC 304. As should be appreciated, the process 305 may identify remote computing devices by their respective Internet Protocol (IP) address, such as an IPv4 or an IPv6 address. The multi-node fabric 100 may enable resolution of network layer addresses (e.g., layer 3 IP addresses) into link layer addresses (e.g., layer 2 MAC addresses). For example, the multi-node fabric 100 may implement the Address Resolution Protocol (ARP) for IPv4 addresses, or Neighbor Discovery Protocol (NDP) for IPv6 addresses. In this case, the multi-node fabric 100 may implement the protocol by allowing nodes, such as the node 102-X, to use various Ethernet switching approaches disclosed herein to broadcast a request (e.g., an ARP/NDP) containing an IP address to discover a MAC address associated with that IP address. The node 102-X may also service similar requests, and respond with a packet including the MAC address assigned to the node 102-X in response to determining the IP address identified in the request matches an IP address of the node 102-X.

Thus the node 102-X may implement an Ethernet translation layer 306 comprising the vESWPort 302 and the vNIC 304 that allows a process (or other operating system component) to initiate the sending and receiving of Ethernet packets via the fabric interface circuit 204-1. As should be appreciated, the Ethernet translation layer 306 may be functionally implemented in hardware or software, or any combination thereof, and is not necessarily limited to the specific example embodiment shown in FIG. 3A.

Figure 3B:
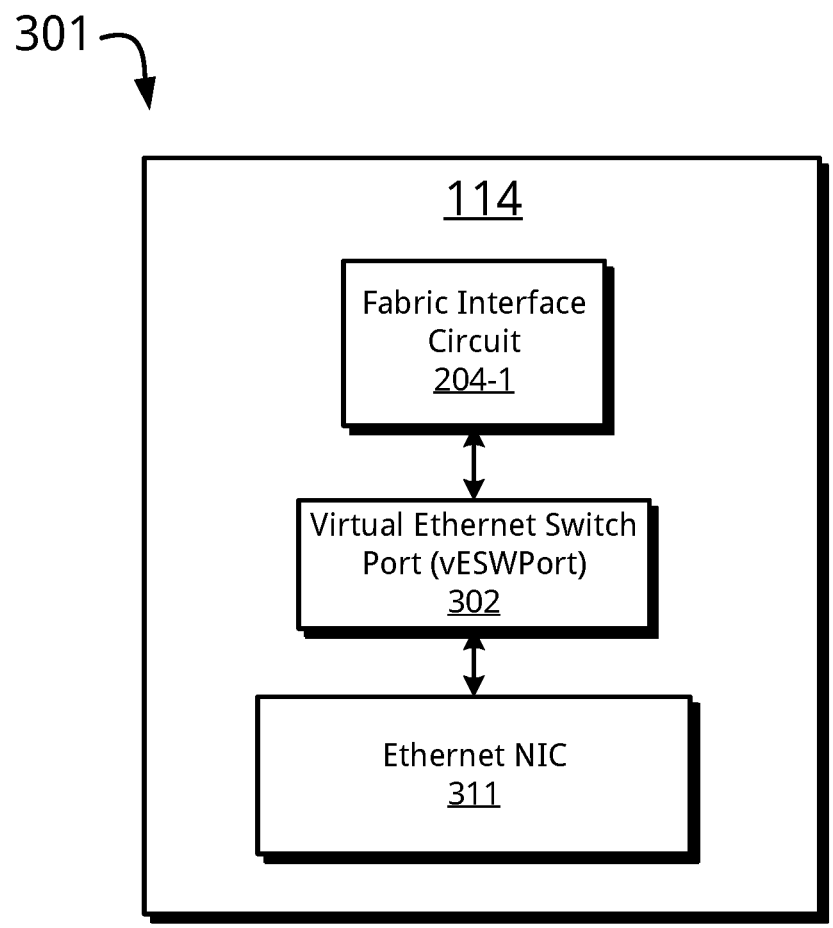
FIG. 3B is a block diagram that illustrates an architecture of an example Ethernet gateway node in further detail, in accordance with an embodiment of the present disclosure.

Turning to FIG. 3B, a block diagram illustrates an example architecture 301 for an Ethernet gateway node 114, in accordance with an embodiment of the present disclosure. As should be appreciated, the architecture 301 of the example Ethernet gateway node 114 is shown in a highly-simplified form. As shown, a fabric interface circuit 204-1 is communicatively coupled to a vESWPort 302, and the vESWPort 302 is communicatively coupled to an Ethernet network interface card/circuit (NIC) 311. As discussed further below with reference to FIGS. 7 and 8, the Ethernet gateway node 114 may be configured to route fabric-routable packets to a particular node based on a LID, a virtual Ethernet switch identifier (e.g. a vESWID) and/or a fabric identifier (Fabric ID) therein. Also, the particular destination may also include an endpoint coupled to an external Ethernet network. Thus the Ethernet NIC 311 may be coupled to an external Ethernet network and allow de-encapsulated Ethernet packets to be routed to a particular Ethernet end-point. Likewise, the Ethernet NIC 311 may be utilized to receive Ethernet packets from an external Ethernet network and provide the same to the vESWPort 302 for encapsulation into fabric-routable packets. Thus the Ethernet gateway node 114 may be configured to perform Ethernet encapsulation and de-encapsulation in accordance with embodiments disclosed herein via its associated vESWPort 302.

Returning to FIG. 1, the nodes 102-1 to 102-6 of the multi-node fabric 100 may be configured to execute distributed memory applications (or parallel applications) that comport with Message Passing Interface (MPI), Shared Memory Access (OpenSHMEM), and Partitioned Global Address Space (PGAS) programming models, although other models are also within the scope of this disclosure. To this end, and in accordance with an embodiment, each of the nodes 102-1 to 102-6 may collectively execute one or more parallel applications in accordance with these programming models. In some cases, each processor device of nodes 102-1 to 102-6, and more particularly, each core provided thereby, may provide a process which is uniquely identifiable and logically addressable within the multi-node fabric 100. For example, and as shown, the node 102-5 may provide processes 104-1 to 104-N, with each process being executed by a dedicated processor core.

The multi-node fabric 100 may provide a dynamic allocation of computing resources such that a parallel application may be executed across M nodes and N processes/cores, with the particular number of nodes and processes being allocated based on the particular implementation of the parallel application. For example, a parallel application may request a particular number of desired processes to perform a desired set of computations. In response, the multi-node fabric 100 may assign a contiguous or non-contiguous range of nodes and associated processes to each parallel application. In some cases, the multi-node fabric 100 may simultaneously support a plurality of such parallel applications, with each of the executed parallel applications having a pool of privately allocated resources.

Figure 4A:
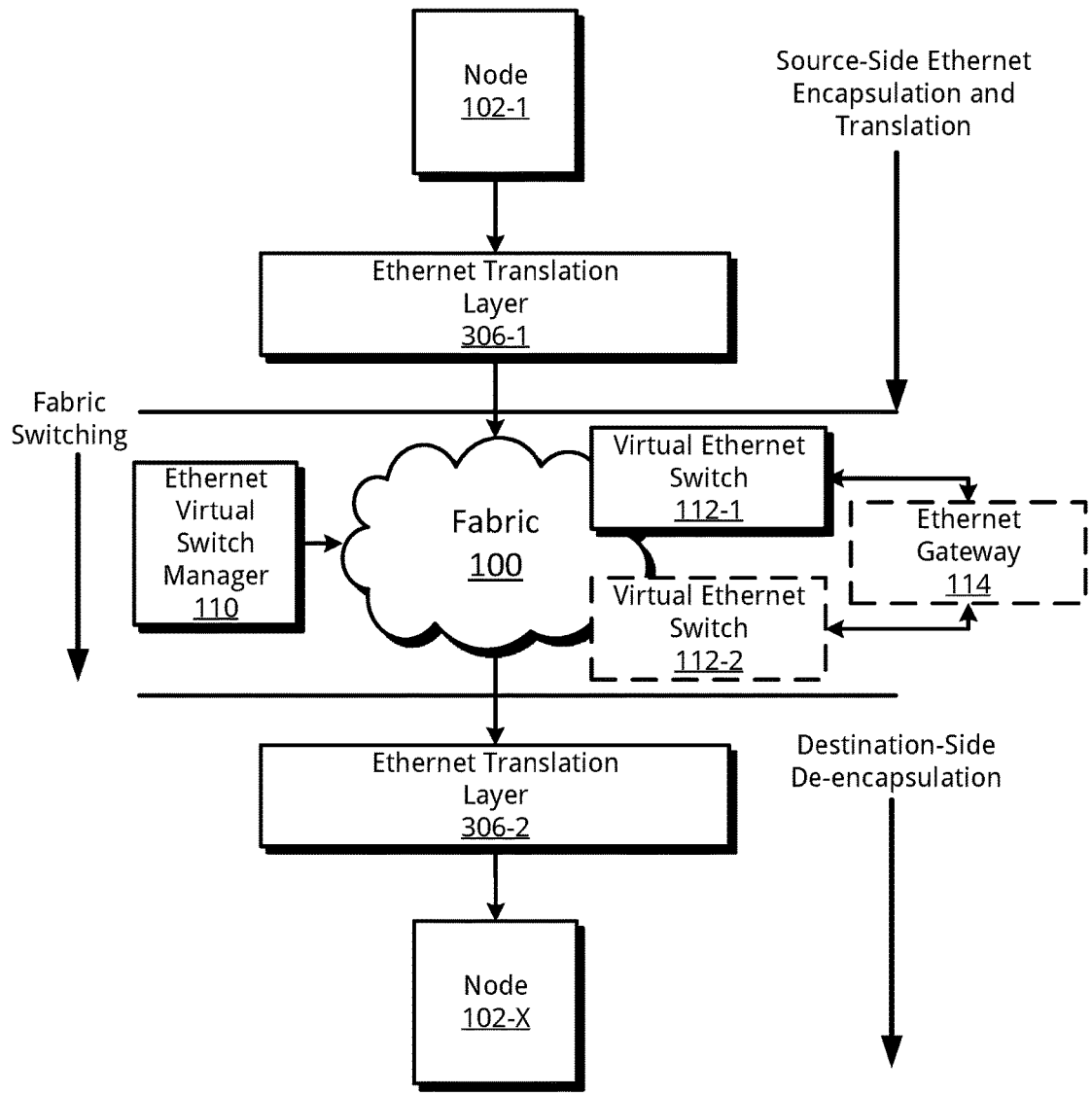
FIG. 4A is a block diagram illustrating an example process flow for virtual Ethernet switching using the multi-node fabric of FIG. 1, in accordance with an embodiment of the present disclosure.

Referring now to FIG. 4A, a block diagram illustrates an example process flow for virtual Ethernet switching using the multi-node fabric 100, in accordance with an embodiment of the present disclosure. As should be appreciated, the example embodiment of FIG. 4A is illustrated in a highly simplified form and should not be construed as limiting the present disclosure. For example, the multi-node fabric 100 may be configured to allow external Ethernet switching to enable exchanging of encapsulated Ethernet packets between nodes of the multi-node fabric 100 and external end-nodes. Alternatively, or in addition to external Ethernet switching, the multi-node fabric 100 may be configured to perform inter-fabric switching such that nodes of two different fabrics may exchange encapsulated Ethernet packets. Some such example embodiments are discussed in further detail below with regard to FIGS. 7 and 8.

The multi-node fabric 100 may implement virtual Ethernet switching by providing one or more virtual Ethernet switching devices, such as the virtual Ethernet switch devices 112-1 and 112-2. In an embodiment, virtual Ethernet switches are implemented in distributed fashion whereby participating nodes (e.g., based on an assigned vESWID) provide the compute resources needed to perform switching of packets. Thus a dedicated node may not be necessary to perform virtual Ethernet switching operations. Each of the participating nodes may include a vESWPort implementation, as discussed above, and may work in concert to provide the necessary aggregate functionality that allows a fabric-routable packet to reach an intended destination. In a sense, the multi-node fabric becomes the internal fabric of the Ethernet switch. A virtual Ethernet switch manager 110 may configure and coordinate the operation of each of the vESWPorts participating in a distributed virtual Ethernet switch.

The virtual Ethernet switch devices 112-1 and 112-2 may allow the multi-node fabric 100 to integrate with external Ethernet network(s) as multiple leaves of the external topology, and not necessarily a single leaf thereof. The virtual Ethernet switching capabilities may be enabled at least in part by the formation of fabric-routable packets with fabric addressing that permits each packet to be routed to an appropriate internal or external end-node.

Each virtual Ethernet switch 112-1 and 112-2, in isolation, may be understood to effectively manifest an independent Ethernet network hosted by the multi-node fabric 100. A fabric Ethernet gateway 114 may allow the exchanging of packets between two or more virtual Ethernet switches of the multi-node fabric 100. In some cases, each node 102-1 to 102-6 may each be associated with a single virtual Ethernet switch by virtue of their assigned vESWID, as previously discussed. For clarity, the following examples and scenarios assume that the nodes 102-1 and 102-X are both associated with the same vESWID, although embodiments featuring multiple virtual Ethernet switches are equally applicable to the present disclosure.

During execution of a process, such as the process 305 of FIG. 3A, the node 102-1 may seek to communicate via Ethernet packets with the node 102-X, or a particular process executed thereon. The node 102-1 may utilize the Ethernet translation layer 306-1 to cause the multi-node fabric 100 to transmit one or more fabric-routable packets which encapsulate Ethernet packets. The destination and source of an Ethernet packet can be identified by a MAC address structure. For example, MAC addresses include 6 octets, with the lowest-order bit of the first octet M (bit 0) distinguishing between multicast MAC addresses and unicast MAC addresses. The next lowest-order bit of the first octet L (bit 1) distinguishes locally-administered addresses from globally-unique addresses. For example, a bit value of one (1) is used to identify locally-administered MAC addresses. On the other hand, a bit value of zero (0) indicates globally-administered MAC addresses, wherein the three leading bytes are an Organizationally Unique Identifier (OUI) and the trailing three bytes are Network Interface Controller (NIC) specific.

In an embodiment, each vESWPort of a node may be assigned locally-administered MAC addresses in accordance with local policies. For example, as shown in FIG. 4F, a local policy may include assigning a fabricID, vESWID, and LID to each fabric interface circuit of a given node. Thus the MAC address of FIG. 4F includes an encoded fabric ID 453, an encoded virtual switch ID 454, and an encoded LID 452. In some cases, each locally-administered MAC address is assigned by the Ethernet virtual switch manager 110. In other cases, a local network administrator may manually configure each node with the particular parameters to utilize when forming a respective locally-administered MAC address.

Figure 4B:
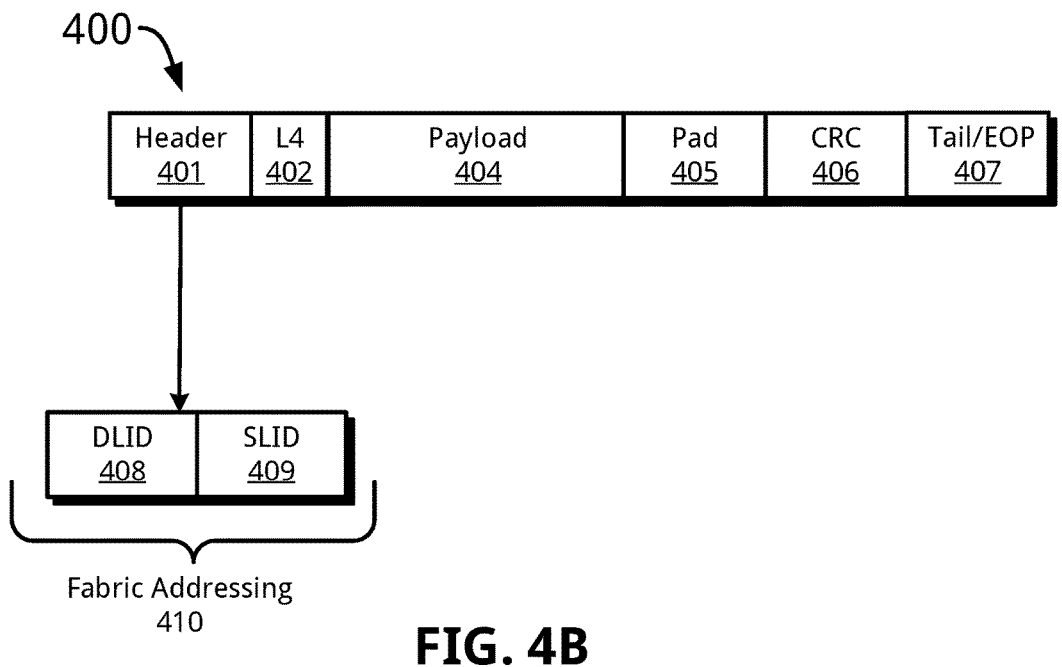
FIG. 4B shows an example fabric-routable packet in accordance with an embodiment of the present disclosure.
Figure 4C:
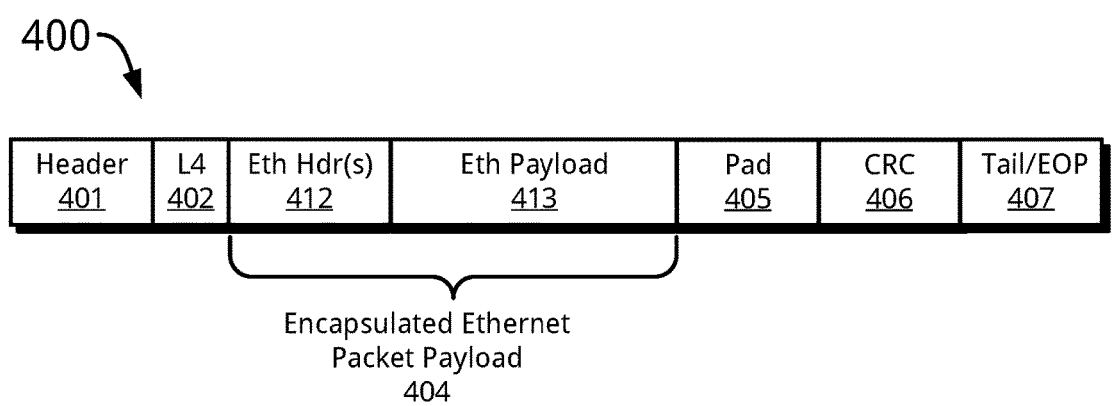
FIG. 4C shows the example fabric-routable packet of FIG. 4B with an encapsulated Ethernet packet payload, in accordance with an embodiment of the present disclosure.

Returning to FIG. 4A, and continuing with the prior example, the node 102-1 may utilize source-side Ethernet encapsulation and translation scheme to form and propagate a fabric-routable packet via the multi-node fabric 100. In an embodiment, the node 102-1 uses the Ethernet Translation layer 306-1 to encapsulate the Ethernet packet into a fabric-routable packet. The fabric-routable packet may identify, for example, a LID corresponding to the node 102-X. One example fabric-routable packet format 400 is shown in FIG. 4B. As should be appreciated, the fabric-routable packet format 400 is illustrated in a highly simplified form. As shown, the fabric-routable packet format 400 includes a header 401, with the header 401 identifying at least an encoded destination local identifier (DLID) and a source LID (SLID), collectively referred to as fabric addressing 410. Packets originating from a given node can include the SLID set to the particular LID assigned to the given node, and a DLID set to the destination LID for the packet. As further shown, the fabric routable packet may include an L4 402 (which may encode information such as particular vESWID), payload 404, a pad 405, a cyclic redundancy (CRC) value 406, and a tail end of packet marker 407. Thus the source-side Ethernet encapsulation and translation scheme may be utilized to encapsulate an Ethernet packet, or at least a portion thereof, into the payload 404 of a fabric-routable packet 400. For example, as shown in FIG. 4C, a resulting fabric-routable packet 400 includes an encapsulated Ethernet packet payload 404 that comprises Ethernet headers 412 and an Ethernet payload 413.

In turn, the node 102-X may utilize destination-side de-encapsulation to receive a fabric-routable packet via the multi-node fabric 100 and extract an Ethernet packet encapsulated therein. In an embodiment, the node 102-X uses the Ethernet Translation layer 306-2 to de-encapsulate an Ethernet packet from a fabric-routable packet received via the multi-node fabric 100. The node 102-X may then present the de-encapsulated Ethernet packet to a process, such as the process 305.

Example Methodology and Architecture

Figure 5A:
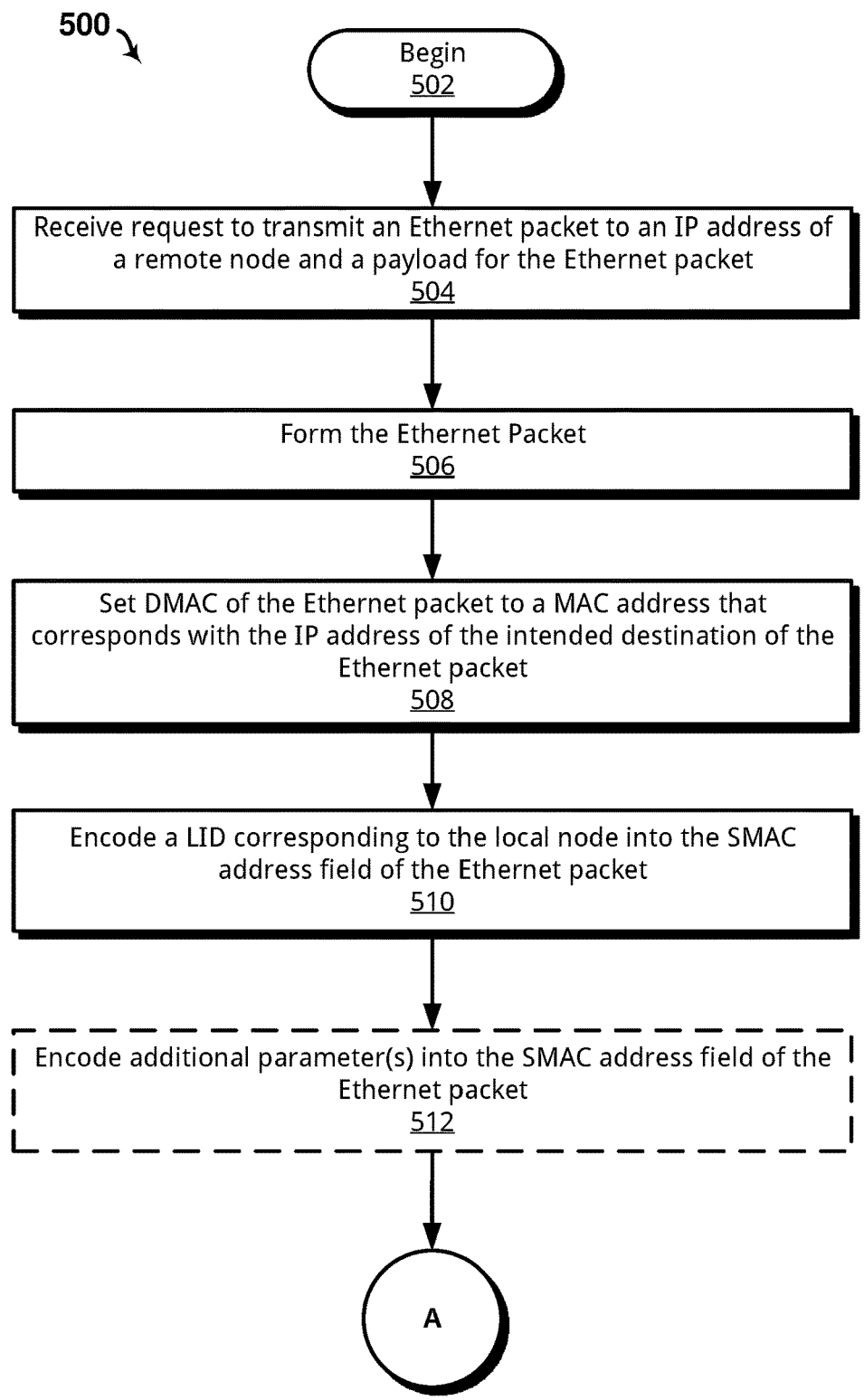
FIGS. 5A-5C collectively show an example method for source-side encapsulation of Ethernet packets within fabric-routable packets and providing the same for transmission via the multi-node fabric of FIG. 1, in accordance with an embodiment of the present disclosure.
Figure 5B:
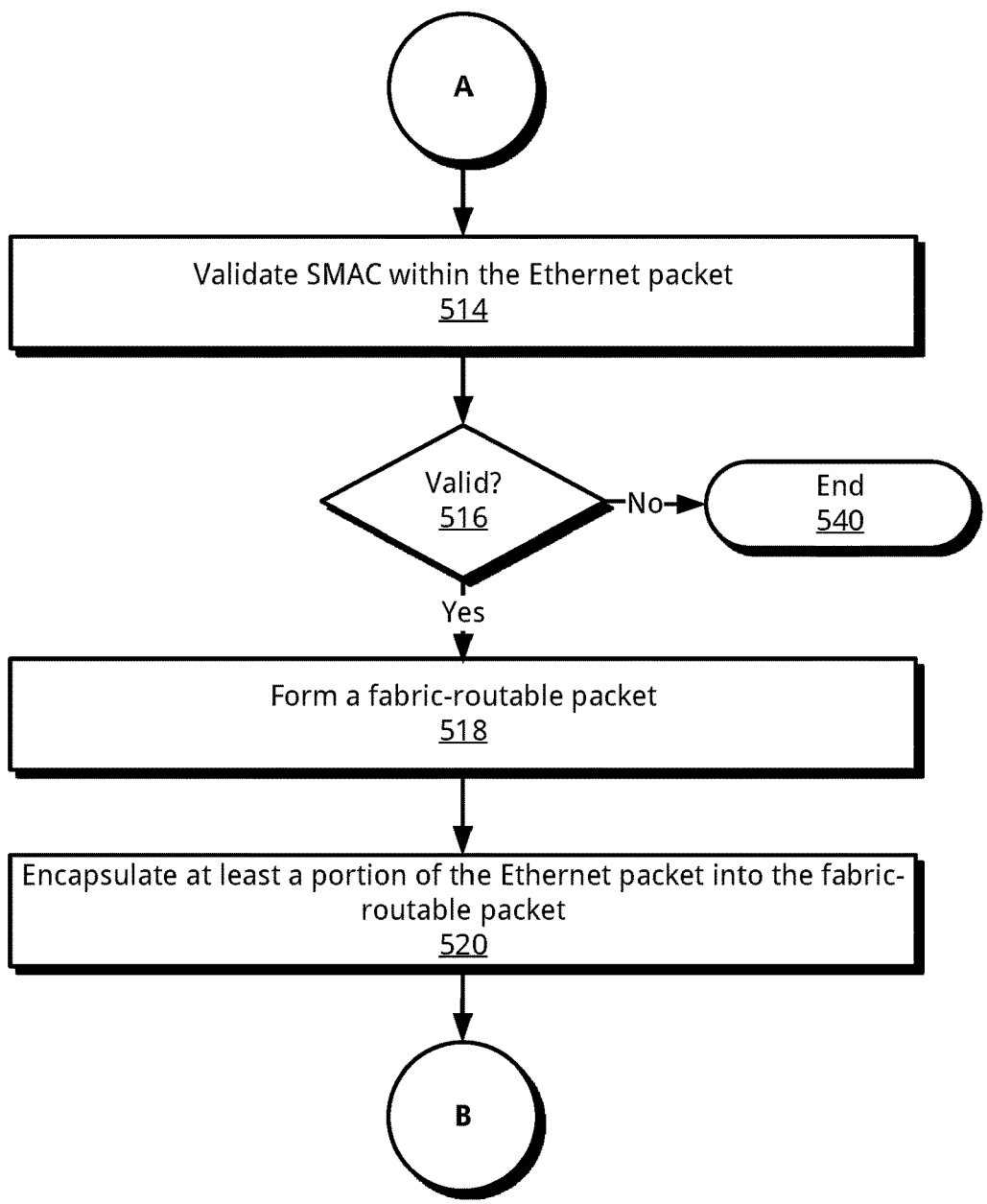

As previously discussed, an embodiment of the present disclosure includes a method for performing source-side Ethernet encapsulation and translation such that a fabric-routable packet is formed that encapsulates an Ethernet packet for transmission to a destination node via the multi-node fabric 100. One such example method 500 is shown in FIG. 5A. The example method 500 may be executed by a node, such as the node 102-X of FIG. 2, and in particular, by the Ethernet translation layer 306 of the node. However, as should be appreciated the method 500 may also be performed, in whole or in part, by the controller 206-1 to 206-N or other suitable controllers/circuits. As should be appreciated, the acts of method 500 may not necessarily be executed in the order given, and moreover, some acts may be omitted, added or otherwise augmented depending on a desired implementation. Method 500 begins in act 502.

Figure 4D:
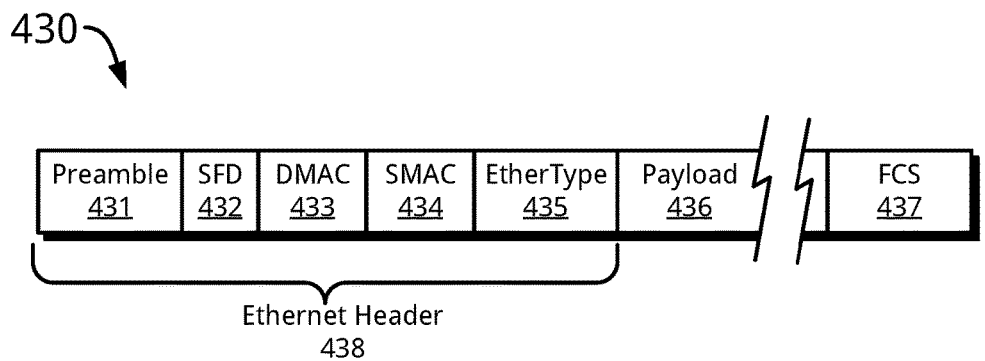
FIG. 4D shows an example Ethernet packet suitable for encapsulation within the fabric-routable packet of FIG. 4A, in accordance with an embodiment of the present disclosure.
Figure 4E:
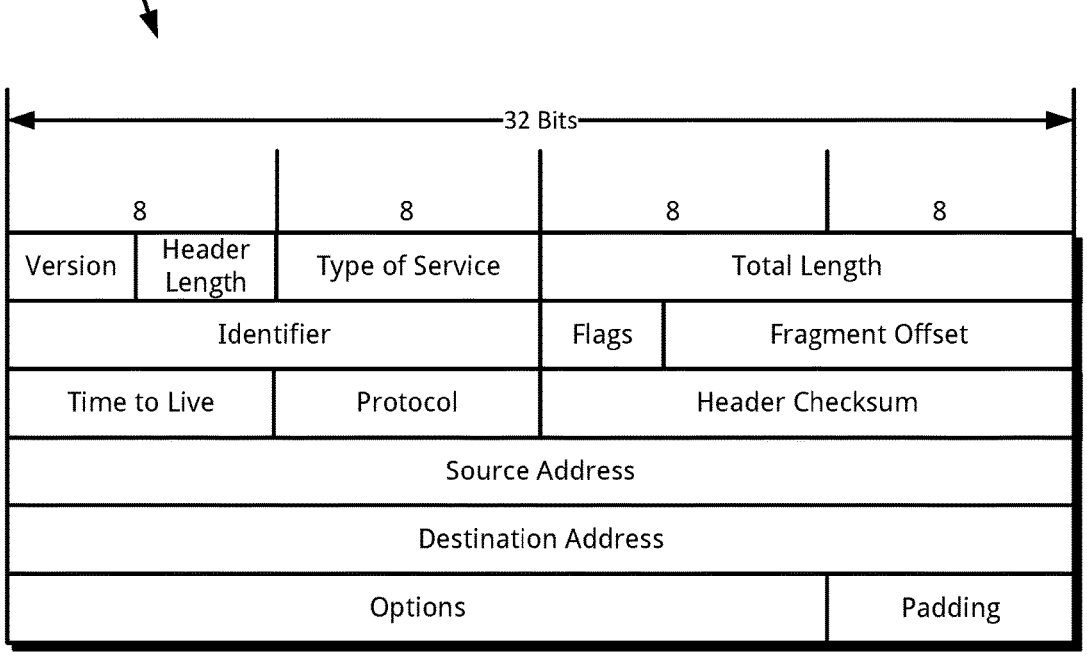
FIG. 4E shows an example IPv4 Ethernet II frame suitable for use as a payload of the Ethernet packet of FIG. 4D, in accordance with an embodiment of the present disclosure.
Figure 4F:
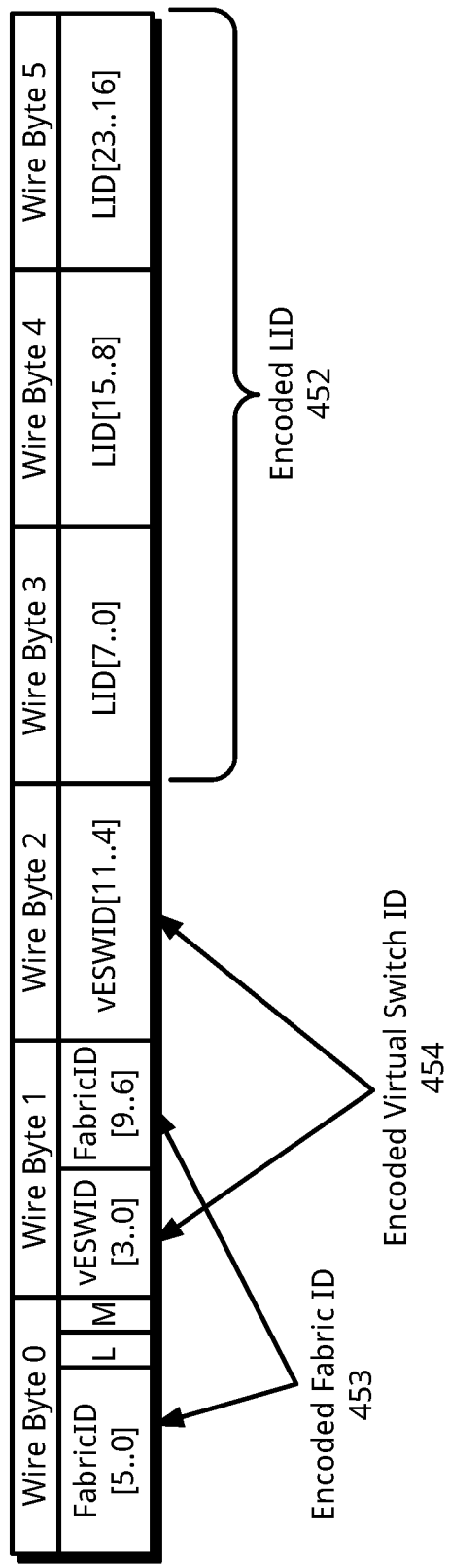
FIG. 4F shows an example of a locally-administered media access control (MAC) address suitable for use in various Ethernet encapsulation techniques disclosed herein, in accordance with an embodiment of the present disclosure.

In act 504, the node receives a request to transmit an Ethernet packet to an IP address of a remote node and a payload for the Ethernet packet. In act 506, the node forms an Ethernet packet for transmission by, for instance, allocating a plurality of contiguous bytes. The Ethernet packet may conform to the Ethernet packet format 430 is shown in FIG. 4D. The Ethernet packet may comprise an Ethernet header 438, a payload 436, and a frame sequence check (FCS) 437. However, also note that the Ethernet header 438 may further include additional fields such as a VLAN tag, for example, and the particular embodiment shown is not intended to be limiting. A full Ethernet header 438 may comprise 14 bytes, or more, and includes a preamble 431, a start frame delimiter (SFD) 432, a destination MAC (DMAC) 433, source MAC (SMAC) 434, and an Ether Type or Protocol Type 435. The payload 436 may comprise any Ethernet-type frame as defined by the Ether Type 435 including, for example, Ethernet II frames, raw IEEE 802.3, IEEE 802.2 LLC, IEEE 802.2 SNAP, just to name a few. One example Ethernet II frame header 436 is shown in FIG. 4E, which illustrates an example IPv4 frame header.

In act 508, the node sets the DMAC of the Ethernet packet to a MAC address that corresponds with the IP address of the intended destination of the Ethernet packet. In an embodiment, and with reference to FIG. 4F, the vNIC 304 may simply set the DMAC 433 to a MAC address which corresponds with the IP address of the intended recipient or destination of the Ethernet packet. In some cases, the destination MAC address may be "discovered" by an ARP or NDP request via the multi-node fabric 100, for example. In other cases, the vNIC 304 may store a lookup table in a memory that correlates each known MAC address with an associated IP address. As previously discussed, both locally-administered MAC addresses and globally-administered MAC addresses may be utilized by techniques disclosed herein. Thus, in some cases, the DMAC may be set to a globally-administered MAC address when, for example, the destination is a remote Ethernet endpoint.

In act 510, the node encodes a LID corresponding to the local node into the SMAC address field of the Ethernet packet. In an embodiment, and with additional reference to FIG. 4F, the vNIC 304 encodes at least a LID into the SMAC address 434, such as shown by the encoded LID bits 452. Recall that the LID uniquely identifies a given fabric interface circuit of a node within the multi-node fabric 100. In act 512, the node may encode additional parameters within the SMAC address 434. For example, the vNIC 304 may encode a fabricID and a vESWID associated with the node in the SMAC, such as shown by the encoded fabric ID 453 and encoded virtual switch ID bits 454.

In act 514, the node validates the SMAC within the Ethernet packet. In act 516, if the SMAC within the Ethernet packet does not correspond to a MAC address assigned to the node, the packet is considered invalid and is dropped or otherwise discarded, and the method 500 ends in act 540. On the other hand, in act 516, if the SMAC address corresponds to a MAC assigned to the node, the node considers the Ethernet packet valid and continues to act 518.

Figure 4G:
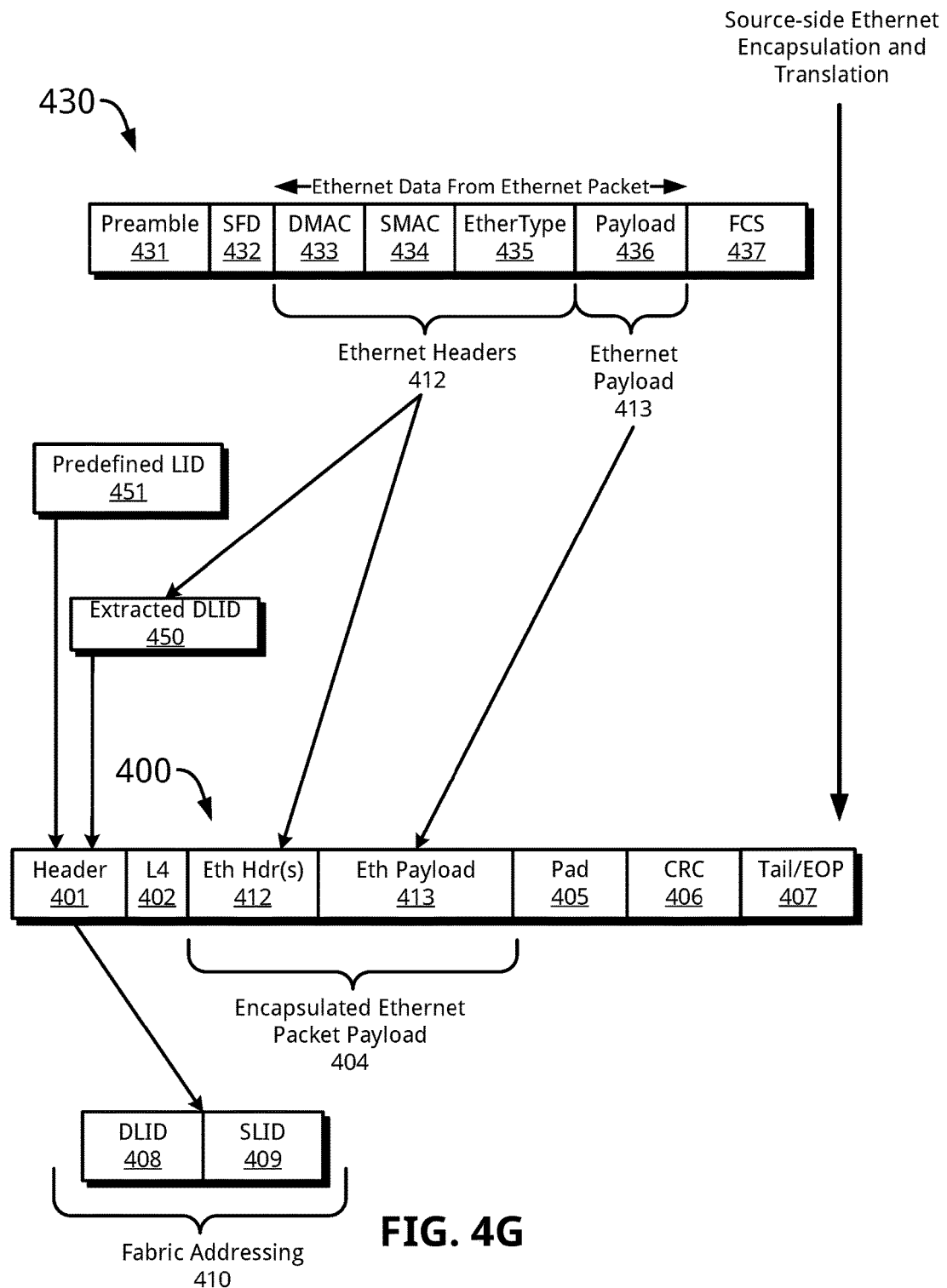
FIG. 4G illustrates an example process flow for a source-side Ethernet encapsulation and translation routine, in accordance with an embodiment of the present disclosure.

In act 518, the node may form a fabric-routable packet by, for example, allocating a plurality of contiguous bytes in a memory. In act 520, the node encapsulates the Ethernet packet into a fabric-routable packet. Some aspects of encapsulation may be better understood by way of illustration. Turning to FIG. 4G an example process flow illustrates an approach to source-side Ethernet encapsulation and translation in accordance with an embodiment. As shown, the node copies or otherwise inserts the Ethernet headers 412 and Ethernet payload 413 corresponding to the Ethernet packet formed in act 506 into the fabric-routable packet 400. Thus the Ethernet header 412 and the Ethernet payload 413 form the encapsulated Ethernet packet payload 404. Some fields of the Ethernet packet may not be encapsulated within the fabric-routable packet 400 such as, for example, the preamble 431, SFD 432 and FCS 437. As the fabric 100 is configured to perform packet switching without examination of an Ethernet packet, these particular fields may be omitted. For instance, the preamble 431 and SFD 432 are legacy artifacts of Ethernet's evolution, and thus may contain no actual information. Also, the Ethernet FCS 437 may be omitted as the fabric CRC 406 substantially performs the same function.

Figure 5C:
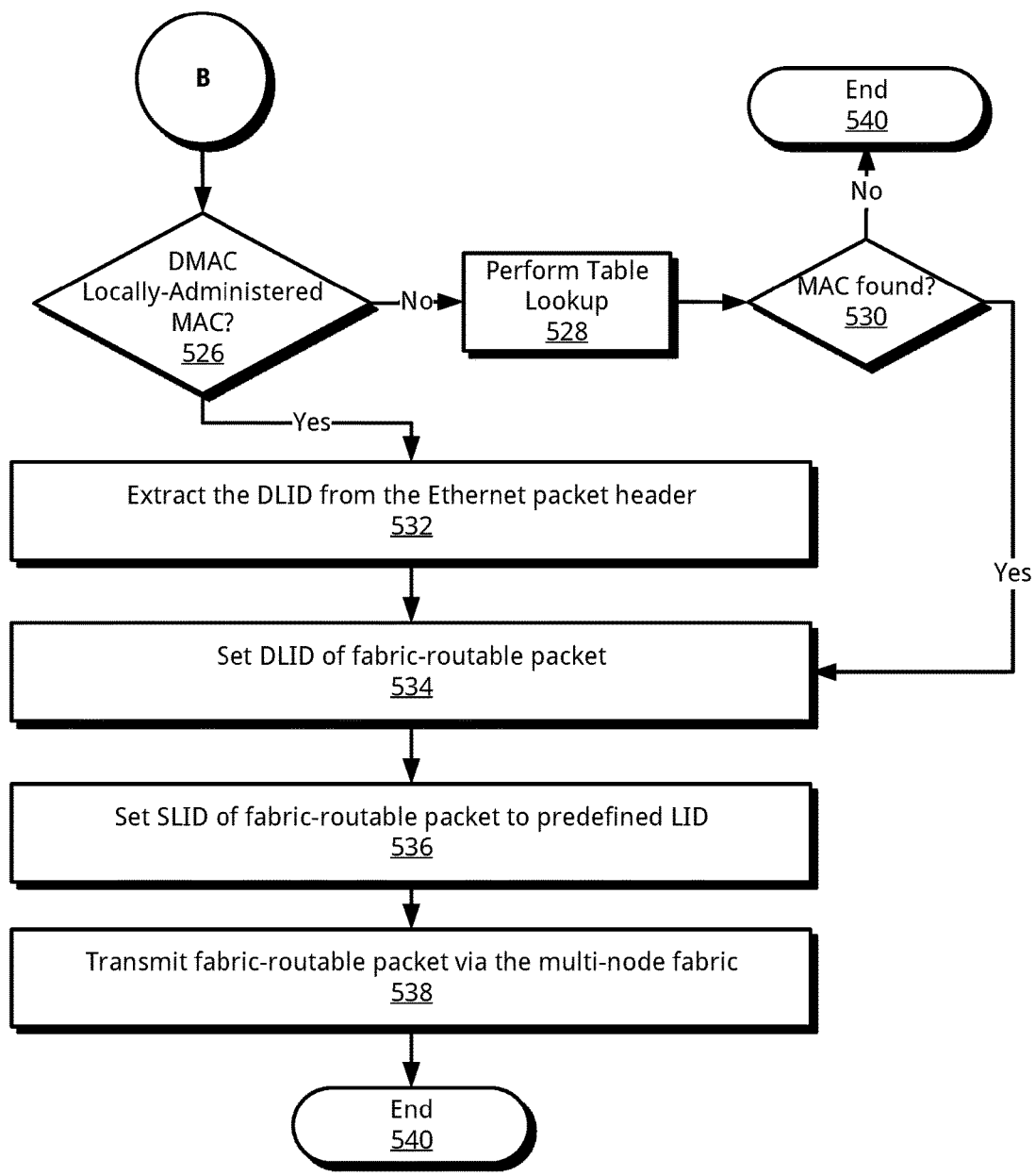

Continuing FIG. 5C, and in act 526, the node determines if the DMAC is a locally-administered address based on examining, for example, the L bit within the MAC address shown in FIG. 4F. If the L bit is set to one (1), the method 500 continues to act 532. Otherwise, the method 500 continues to act 528.

In act 528, the node performs a lookup in a table to determine if the DMAC address is known. Each entry in the table may include a MAC and a corresponding LID. In act 530, if an entry within the table includes a MAC that matches the DMAC address, the method 500 continues to act 534. Otherwise, the Ethernet packet and the fabric-routable packet are dropped or otherwise discarded and the method ends in act 540.

In act 532, the node extracts the DLID from the Ethernet packet header. In some cases, extraction includes reconstituting the DLID (e.g., using bit-wise operations) into a contiguous set of bits to form a single value. In act 534, the node sets the DLID of the fabric-routable packet to either the DLID extracted in act 532, or the LID found within the lookup table during act 530. Referring again to FIG. 4G, the node may use an extracted DLID 450 from the DMAC 433 portion of the Ethernet headers 412 to set to set a corresponding DLID 408 within the fabric-routable packet header 401.

Returning to FIG. 5C, and in act 536, the node sets the SLID of the fabric-routable packet to the predefined LID. Recall the predefined LID is an assigned address that allows a given fabric interface circuit of the node to be uniquely identified within the multi-node fabric 100. Referring again to FIG. 4G, the node may use the predefined LID 451 to set the SLID 409 of the header 401. Thus, with both the DLID 408 and the SLID 409 set within the header 401, the fabric-routable packet may be understood to have a complete fabric address 410 for routing purposes.

Returning to FIG. 5C, and in act 538, the node may transmit the fabric-routable packet via the multi-node fabric 100. In turn, the multi-node fabric 100 may route the fabric-routable packet to an appropriate node using, for example, L2 switching. As should be appreciated, and in accordance with an embodiment, the multi-node fabric 100 does not inspect the encapsulated Ethernet packet to perform any part of the switching through the multi-node fabric 100. Instead, and in a general sense, the normally L2 Ethernet packet is "pushed" into the network layer (L3) by virtue of its encapsulation within a fabric-routable packet.

In some cases, the source and destination nodes may both be associated with a same virtual Ethernet switch (e.g., has a same vESWID), and the same multi-node fabric (e.g., has the same FabricID). In these cases, a virtual Ethernet switch, such as the virtual Ethernet switch 112-1 of FIG. 4A, may direct the fabric-routable packet to the destination node. As previously discussed, the virtual Ethernet switch 112-1 may not necessarily be a single entity and instead may comprise a plurality of subscribing vESWPorts. Conversely, if the source and destination nodes are not associated with the same virtual Ethernet switch, or are otherwise associated with different fabrics, the multi-node fabric 100 may route the fabric-routable packet through an Ethernet gateway, such as the Ethernet gateway 114 of FIG. 4A.

Figure 7:
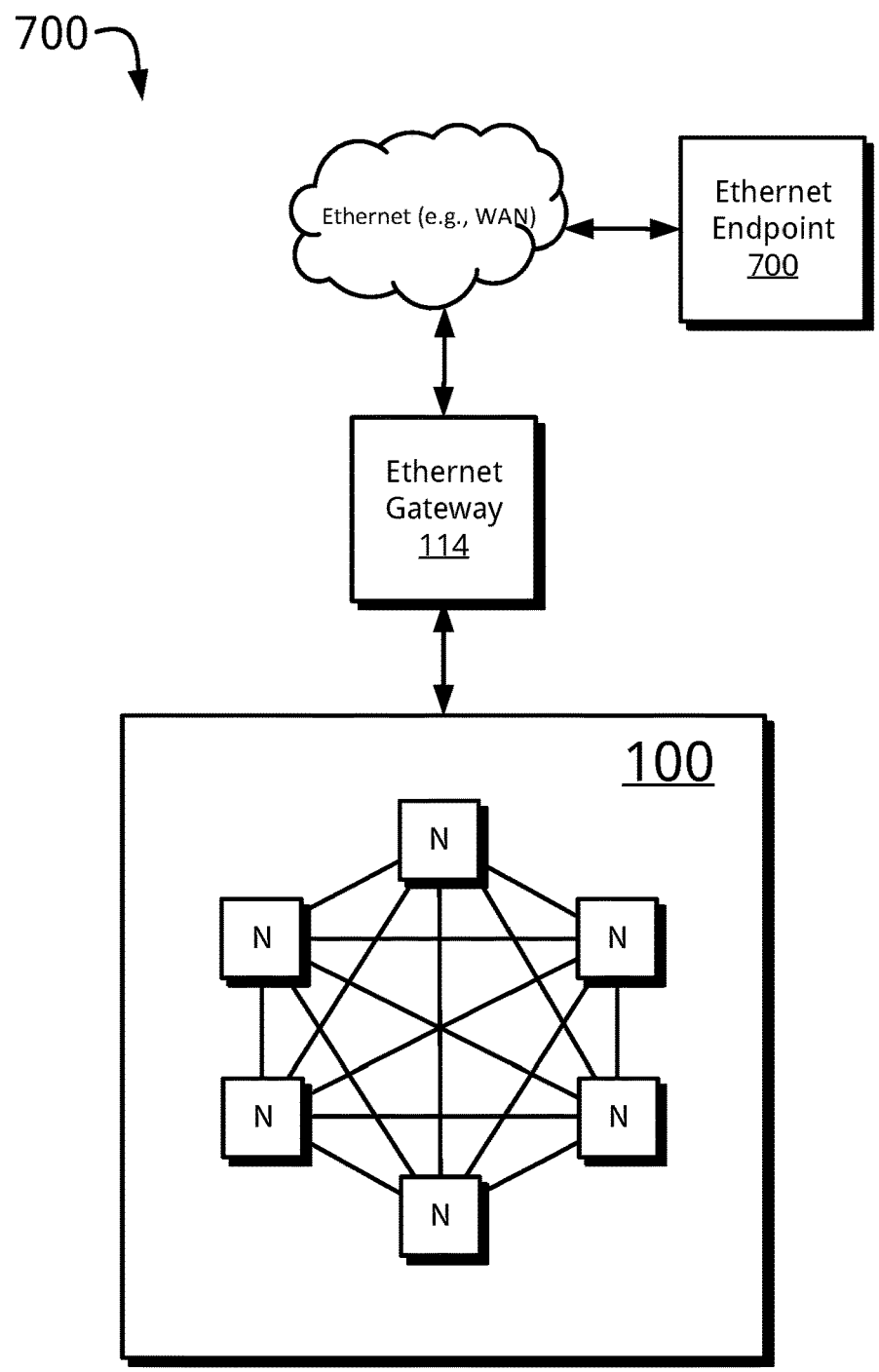
FIG. 7 shows an example fabric-topology including the multi-node fabric of FIG. 1 communicatively coupled to an external Ethernet network via an Ethernet gateway, in accordance with an embodiment of the present disclosure.
Figure 8:
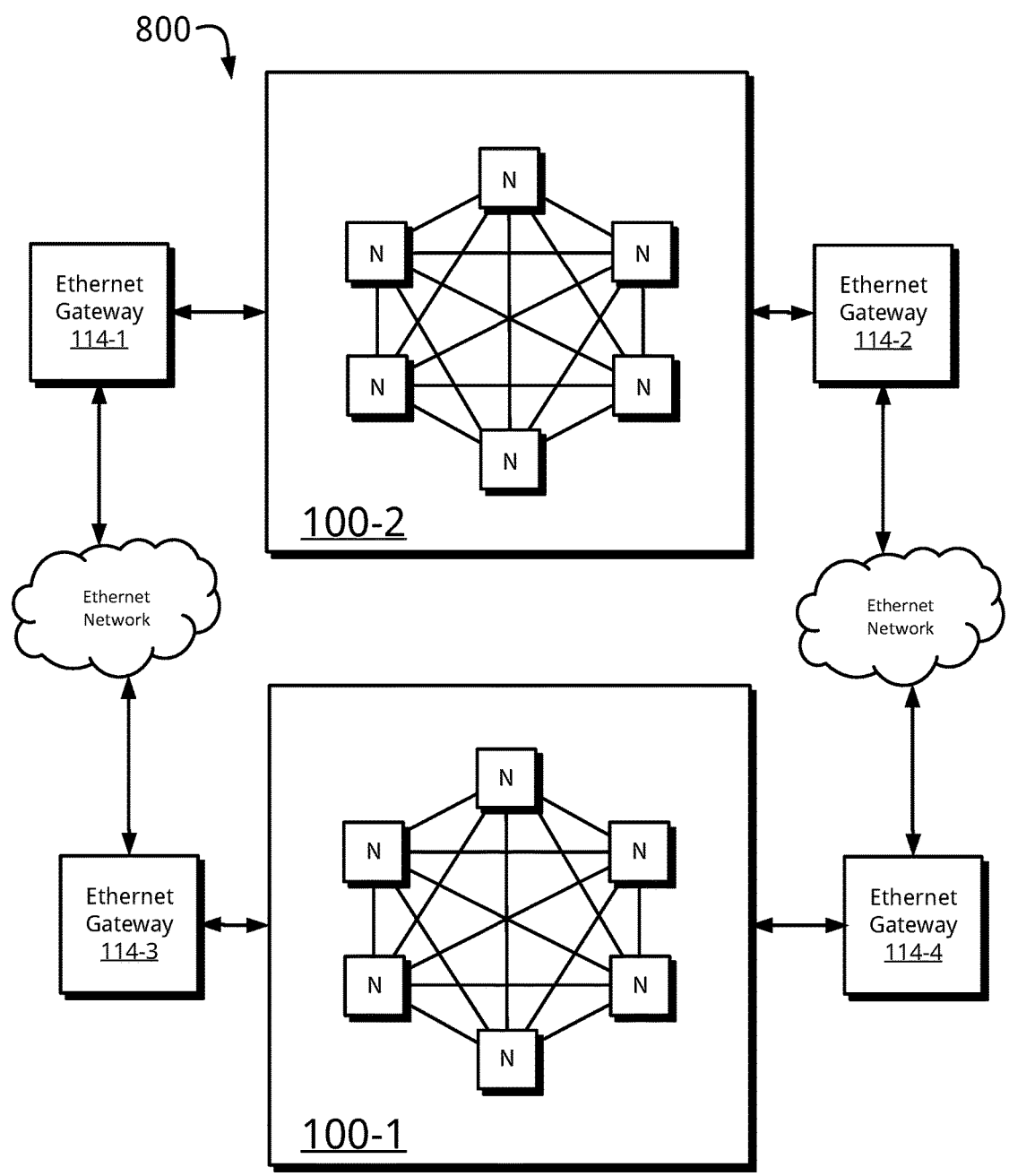
FIG. 8 shows another example fabric-topology including two multi-node fabrics communicatively coupled via a plurality of Ethernet gateways, in accordance with an embodiment of the present disclosure.

For example, as shown in FIG. 7, the destination node may be an Ethernet endpoint 700 coupled to a remote Ethernet network, such as a wide-area-network (WAN) such as the Internet. In this instance, the Ethernet gateway 114 may allow a node of the multi-node fabric 100 to communicate bi-directionally with the Ethernet endpoint 700. Likewise, as shown in FIG. 8, nodes from two or more multi-node fabrics may exchange Ethernet packets encapsulated in fabric-routable packets. As shown, a plurality of Ethernet gateways 114-1 to 114-4 may receive fabric-routable packets from computing nodes of a first multi-node fabric 100-1 or a second multi-node fabric 100-2, and may forward them to an appropriate opposite gateway based on the Fabric ID located within each encapsulated Ethernet packet. For example, if a node within the first multi-node fabric 100-1 transmits a routable-packet with an encapsulated Ethernet packet to a node of the second (or remote) multi-node fabric 100-2 (e.g., FabricID=2), one of the Ethernet gateways 114-3 or 114-4 may forward the same to an opposite Ethernet Gateway 114-1 or 114-2, respectively. In turn, the receiving Ethernet gateway may then forward the fabric-routable packet to the appropriate node. As should be appreciated, each Ethernet gateway may also include the Ethernet translation layer 306, or an equivalent thereof, allowing each Ethernet gateway to inspect encapsulated Ethernet packets for the purposes of ensuring they reach, for example, an appropriate end-node. For example, each Ethernet gateway may include an Ethernet forwarding component that can map an Ethernet DMAC address to a LID. Moreover, Ethernet gateways may perform de-encapsulation of Ethernet packets for the purposes of providing the same to an Ethernet network.

Figure 6:
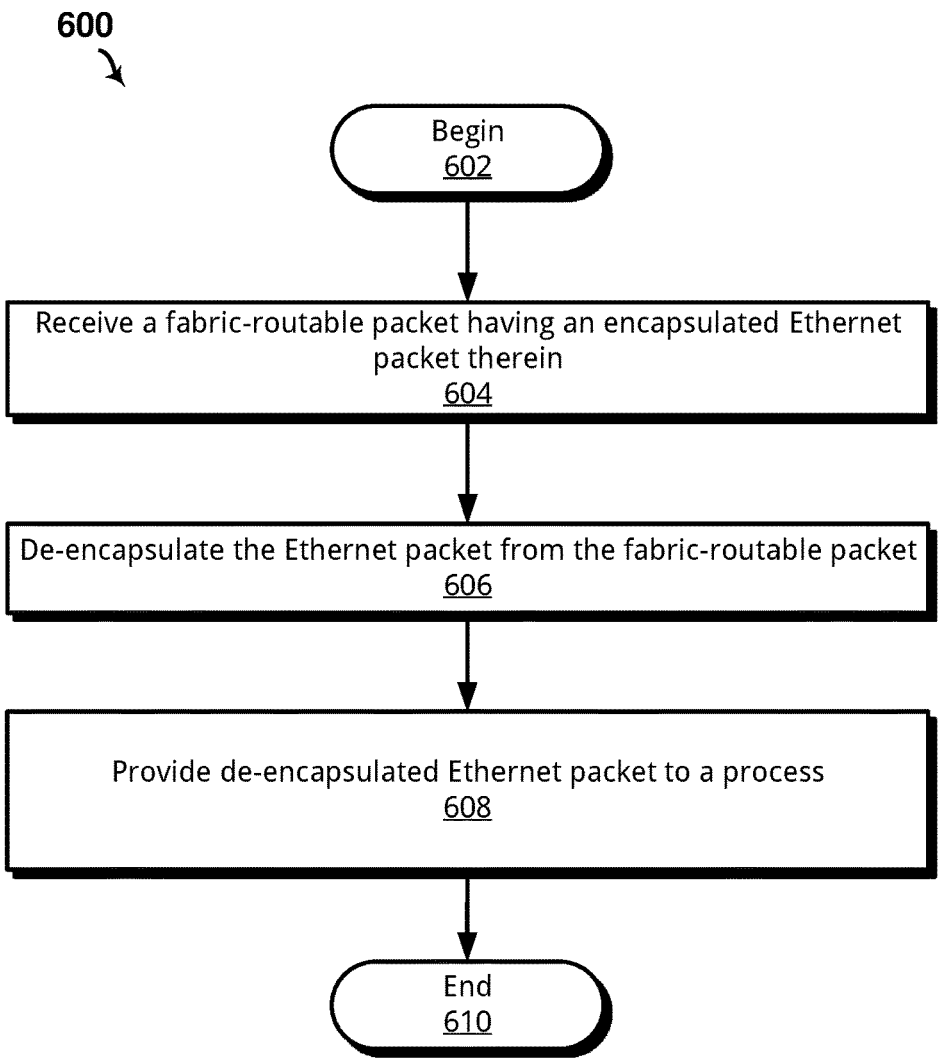
FIG. 6 shows an example method for destination-side de-encapsulation of Ethernet packets within fabric-routable packets received via the multi-node fabric of FIG. 1, in accordance with an embodiment of the present disclosure.

As previously discussed, an embodiment of the present disclosure includes a method for destination-side de-encapsulation of an Ethernet packet from a fabric-routable packet received via the multi-node fabric 100. One such example method 600 is shown in FIG. 6. The example method 600 may be executed by a node, such as the node 102-X of FIG. 2, and in particular, by the Ethernet translation layer 306 of the node. However, as should be appreciated the method 600 may also be performed, in whole or in part, by the controller 206-1 to 206-N or other suitable controllers/circuits. As should be appreciated, the acts of method 600 may not necessarily be executed in the order given, and moreover, some acts may be omitted, added or otherwise augmented depending on a desired implementation. Method 600 begins in act 602.

Figure 4H:
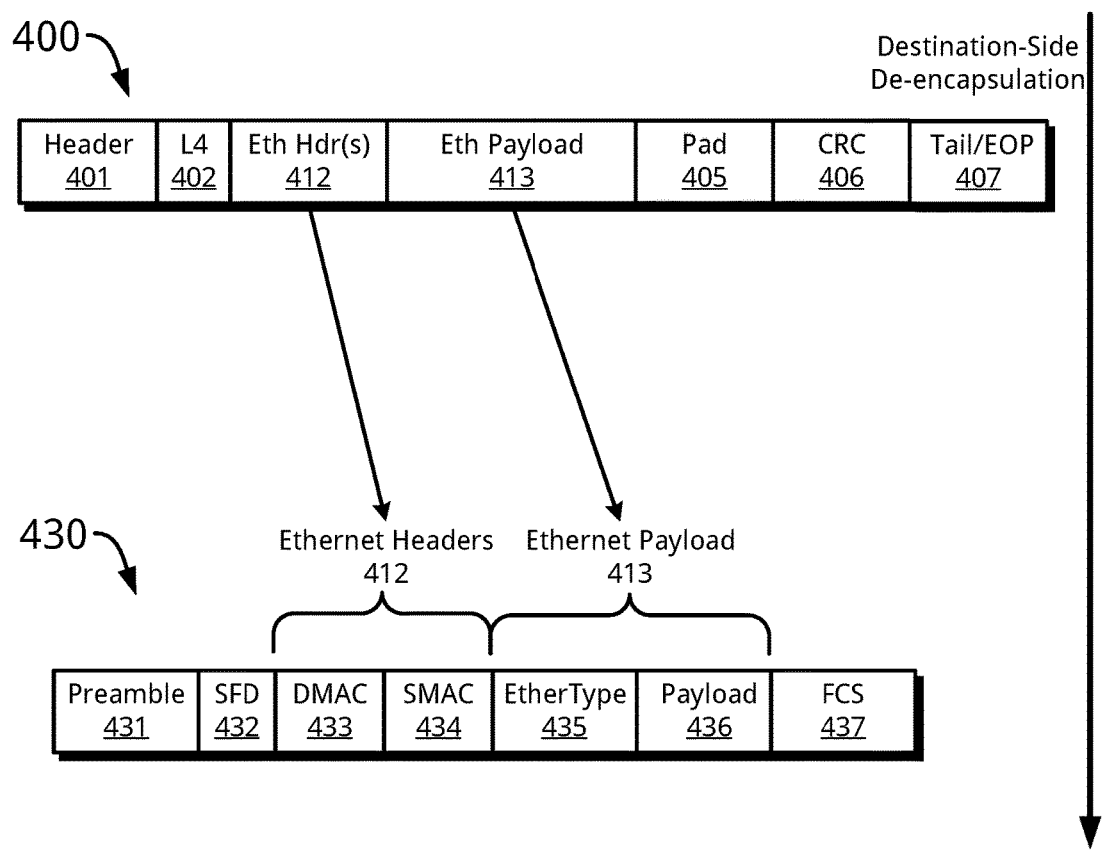
FIG. 4H illustrates an example process flow for a destination-side Ethernet de-encapsulation routine, in accordance with an embodiment of the present disclosure.

In act 604, the node receives a fabric-routable packet having an encapsulated Ethernet packet therein via the multi-node fabric 100. In act 606, the node de-encapsulates the Ethernet packet from the fabric-routable packet. For example, as shown in FIG. 4H, the node may de-encapsulate an Ethernet packet by simply copying the Ethernet headers 412 and Ethernet payload 413 onto a contiguous plurality of bytes representing the Ethernet packet 430. The node may also optionally set the preamble 431, SFD 432, and FCS 437, such that, for example, the vNIC 304 (FIG. 3A) receives a complete and valid Ethernet packet. Returning to FIG. 6, and in act 608, the node, and more particularly, the vNIC 304 may present at least the payload 436 to the process 305 executed within user-space. The method 600 ends in act 610.

Example System

FIG. 9 illustrates a computing system 900 configured to perform various processes disclosed herein and may operate as a node within the multi-node fabric 100. In more detail, system 900 may be incorporated into a personal computer (PC), laptop computer, wearable computing device, ultra-laptop computer, tablet, touch pad, portable computer, hand-held computer, palmtop computer, personal digital assistant (PDA), cellular telephone, combination cellular telephone/

PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 900 comprises a platform 902 coupled to a display 920. Platform 902 may receive content from a content device such as content services device(s) 930 or content delivery device(s) 940 or other similar content sources. A navigation controller 950 comprising one or more navigation features may be used to interact with, for example, platform 902 and/or display 920, so as to supplement navigational gesturing by the user. Each of these example components is described in more detail below.

In some embodiments, platform 902 may comprise any combination of a chipset 905, processor 910, memory 912, storage 914, graphics subsystem 915, camera 919, motion sensors 921, applications 916 and/or radio 918 or wireless transceiver circuit. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 910 may comprise dual-core processor(s), dual-core mobile processor(s), and so forth. Memory 912 may be implemented, for instance, as a volatile memory device such as, but not limited to, a Random Access Memory (RAM), Dynamic Random Access Memory (DRAM), or Static RAM (SRAM). Storage 914 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 914 may comprise technology to increase the storage performance enhanced protection for valuable digital media when multiple hard drives are included, for example.

Graphics subsystem 915 may perform processing of images such as still or video for display, and in some embodiments is configured to synthesize face images, as variously described herein. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 could be integrated into processor 910 or chipset 905. Graphics subsystem 915 could be a stand-alone card communicatively coupled to chipset 905. The graphics and/or video processing techniques, including the techniques for identifying and producing preferred face orientations described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 918 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In some embodiments, content services device(s) 930 may be hosted by any national, international and/or independent service and thus accessible to platform 902 via the Internet or other network, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920. In some embodiments, content services device(s) 930 may comprise a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, graphics, text, medical and gaming content, and so forth.

Content services device(s) 930 receives content such as cable television programming including media information, digital information, and/or other content. Examples of content providers may include any cable or satellite television or radio or Internet content providers. The provided examples are not meant to limit the present disclosure. In some embodiments, platform 902 may receive control signals from navigation controller 950 having one or more navigation features. The navigation features of controller 950 may be used to interact with user interface 922, for example. In some embodiments, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 950 may be echoed on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In some embodiments, controller 950 may not be a separate component but integrated into platform 902 and/or display 920. Embodiments, however, are not limited to the elements or in the context shown or described herein, as will be appreciated.

In some embodiments, drivers (not shown) may comprise technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 when the platform is turned "off." In addition, chipset 905 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, images (e.g., selfies, etc.), video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 9.

As described above, system 900 may be embodied in varying physical styles or form factors. FIG. 9 illustrates embodiments of a small form factor device 900 in which system 900 may be embodied. In some embodiments, for example, device 900 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, mobile electronic device 900 may comprise a housing 902, a display 904, an input/output (I/O) device 906, and an antenna 908. Device 900 also may comprise navigation features 912. Display 904 may comprise any suitable display unit for displaying information appropriate for a mobile computing device, which in one example embodiment is a touchpad display. I/O device 906 may comprise any suitable I/O device for entering information into a mobile computing device. Examples for I/O device 906 may include an alphanumeric keyboard, a numeric keypad, a touch pad, input keys, buttons, a camera, switches, rocker switches, microphones, speakers, voice recognition device and software, and so forth. Information also may be entered into device 900 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, systems on-chip, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Further Example Embodiments

The following examples pertain to further embodiments, from which numerous permutations and configurations will be apparent.

Example 1 discloses a method for exchanging Ethernet packets over a multi-node fabric comprising a plurality of communicatively coupled compute nodes, the method comprising receiving, by a controller, an Ethernet packet having a header portion that includes a destination media access control (MAC) address, the destination MAC address including a local identifier (LID) of a node encoded therein, extracting, by the controller, the LID from the destination MAC address, encapsulating, by the controller, the Ethernet packet into a fabric-routable packet, wherein the fabric-routable packet includes a header portion with a destination LID set the extracted LID, and causing to be transmitted, by the controller, the fabric-routable packet to the node associated with the extracted LID via the multi-node fabric.

Example 2 includes the subject matter of Example 1, wherein the controller is implemented within a fabric interface circuit.

Example 3 includes the subject matter of any one of Examples 1-2, wherein the destination MAC is a locally-administered MAC address.

Example 4 includes the subject matter of any one of Examples 1-3, wherein the header portion of the fabric-routable packet further includes a source LID.

Example 5 includes the subject matter of any one of Examples 1-4, further comprising setting the source LID to a predefined value associated with the controller.

Example 6 includes the subject matter of any one of Examples 1-5, wherein the destination MAC address further includes an encoded virtual switch identifier encoded therein.

Example 7 includes the subject matter of any one of Examples 1-6, wherein the destination MAC address further includes an encoded fabric identifier encoded therein.

Example 8 includes the subject matter of any one of Examples 1-7, wherein the Ethernet packet includes a payload, and wherein the payload comprises an Ethernet II frame.

Example 9 includes the subject matter of Example 8, wherein the Ethernet II frame comprises one of a user datagram protocol (UDP) frame or a transmission control protocol (TCP) frame.

Example 10 includes the subject matter of any one of Examples 8-9, wherein the Ethernet II frame comprises an IPv4 or IPv6 frame.

Example 11 includes the subject matter of any one of Examples 1-10, wherein the Ethernet packet comprises a multicast or unicast packet.

Example 12 includes the subject matter of any one of Examples 1-11, further comprising receiving, by the controller, a request to send an Ethernet packet to a destination internet protocol (IP) address from a process executed in user-space memory, the request including a payload, forming, by the controller, an Ethernet packet, the Ethernet packet having a header including a destination MAC address and a source MAC address, setting, by the controller, the destination MAC address to a MAC address that corresponds with the destination IP address, and setting, by the controller, the source MAC address by encoding a source LID into the source MAC address, the source LID corresponding a predefined value associated with the controller.

Example 13 includes the subject matter of Example 12, wherein the destination MAC address comprises an encoded LID associated with a node of the multi-node fabric.

Example 14 includes the subject matter of Example 12, wherein the destination MAC address comprises an encoded fabric identifier, the encoded fabric identifier corresponding to the multi-node fabric or a remote multi-node fabric.

Example 15 includes the subject matter of Example 12, wherein the destination MAC address comprises an encoded virtual switch identifier, the encoded virtual switch identifier corresponding to a virtual Ethernet switch associated with the multi-node fabric or a remote multi-node fabric.

Example 16 includes the subject matter of any one of Examples 1-15, further comprising receiving, by the controller, a fabric-routable packet, de-encapsulating, by the controller, an Ethernet packet within the received fabric-routable packet, and providing the de-encapsulated Ethernet packet to a process executed in user-space memory.

Example 17 discloses a system comprising, the system comprising a first node device comprising a memory, circuitry configured to be communicatively coupled to a multi-node fabric, the circuitry being configured to receive an Ethernet packet having a header portion that includes a destination media access control (MAC) address, the destination MAC address including a local identifier (LID) of a node encoded therein, extract the LID from the destination MAC address, encapsulate the Ethernet packet into a fabric-routable packet, wherein the fabric-routable packet includes a header portion with a destination LID set the extracted LID, and cause the fabric-routable packet to be transmitted to the node associated with the extracted LID via the multi-node fabric.

Example 18 includes the subject matter of Example 17, wherein the circuitry of the first node device comprises a network interface circuit.

Example 19 includes the subject matter of any one of Examples 17-18, wherein the destination MAC is a locally-administered MAC address.

Example 20 includes the subject matter of any one of Examples 17-19, wherein the header portion of the fabric-routable packet further includes a source LID.

Example 21 includes the subject matter of Example 20, wherein the circuitry of the first node device is further configured to set the source LID to a predefined value associated with the controller.

Example 22 includes the subject matter of any one of Examples 17-21, wherein the destination MAC address further includes an encoded virtual switch identifier encoded therein.

Example 23 includes the subject matter of any one of Examples 17-22, wherein the destination MAC address further includes an encoded fabric identifier encoded therein.

Example 24 includes the subject matter of any one of Examples 17-23, wherein the Ethernet packet includes a payload, and wherein the payload comprises an Ethernet II frame.

Example 25 includes the subject matter of Example 24, wherein the Ethernet II frame comprises one of a user datagram protocol (UDP) frame or a transmission control protocol (TCP) frame.

Example 26 includes the subject matter of Example 24, wherein the Ethernet II frame comprises an IPv4 or IPv6 frame.

Example 27 includes the subject matter of any one of Examples 17-26, wherein the Ethernet packet comprises a multicast or unicast packet.

Example 28 includes the subject matter of any one of Examples 17-27, the circuitry of the first node device being further configured to receive a request to send an Ethernet packet to a destination internet protocol (IP) address from a process executed in user-space memory, the request including a payload, form an Ethernet packet, the Ethernet packing having a header including a destination MAC address and a source MAC address, set the destination MAC address to a MAC address that corresponds with the destination IP address, and set the source MAC address by encoding a source LID into the source MAC address, the source LID corresponding a predefined value associated with the controller.

Example 29 includes the subject matter of Example 28, wherein the destination MAC address comprises an encoded LID associated with a node of the multi-node fabric.

Example 30 includes the subject matter of Example 28, wherein the destination MAC address comprises an encoded fabric identifier, the encoded fabric identifier corresponding to the multi-node fabric or a remote multi-node fabric.

Example 31 includes the subject matter of Example 28, wherein the destination MAC address comprises an encoded virtual switch identifier, the encoded virtual switch identifier corresponding to a virtual Ethernet switch associated with the multi-node fabric or a remote multi-node fabric.

Example 32 includes the subject matter of any one of Examples 17-31, the circuitry of the first node device being further configured to receive a fabric-routable packet, de-encapsulate an Ethernet packet within the received fabric-routable packet, and provide the de-encapsulated Ethernet packet to a process executed in a user-space of the memory.

Example 33 discloses a non-transitory computer-readable medium having a plurality of instructions encoded thereon that when executed by at least one processor cause a process to be carried out, the process being configured to receive an Ethernet packet having a header portion that includes a destination media access control (MAC) address, the destination MAC address including a local identifier (LID) of a node encoded therein, extract the LID from the destination MAC address, encapsulate the Ethernet packet into a fabric-routable packet, wherein the fabric-routable packet includes a header portion with a destination LID set to the extracted LID, and cause the fabric-routable packet to be transmitted to the node associated with the extracted LID via the multi-node fabric.

Example 34 includes the subject matter of Example 33, wherein the controller is implemented within a fabric interface circuit.

Example 35 includes the subject matter of any one of Examples 33-34, wherein the destination MAC is a locally-administered MAC address.

Example 36 includes the subject matter of any one of Examples 33-35, wherein the header portion of the fabric-routable packet further includes a source LID.

Example 37 includes the subject matter of Example 36, further comprising setting the source LID to a predefined value associated with the controller.

Example 38 includes the subject matter of any one of Examples 33-37, wherein the destination MAC address further includes an encoded virtual switch identifier encoded therein.

Example 39 includes the subject matter of any one of Examples 33-38, wherein the destination MAC address further includes an encoded fabric identifier encoded therein.

Example 40 includes the subject matter of any one of Examples 33-39, wherein the Ethernet packet comprises a multicast or unicast packet.

Example 41 discloses a system, the system comprising a network interface circuit to receive an Ethernet packet having a header portion that includes a destination media access control (MAC) address, the destination MAC address including a local identifier (LID) of a node encoded therein, the LID uniquely identifying a fabric interface circuit associated with the node within a multi-node fabric, means for extracting the LID from the destination MAC address, means for encapsulating the Ethernet packet into a fabric-routable packet, wherein the fabric-routable packet includes a header portion with a destination LID set to the extracted LID, and wherein the network interface circuit is configured to transmit the fabric-routable packet to a node associated with the extracted LID via the multi-node fabric.

Example 42 includes the subject matter of Example 41, wherein the destination MAC is a locally-administered MAC address.

Example 43 includes the subject matter of any one of Examples 41-42, wherein the destination MAC address further includes an encoded virtual switch identifier encoded therein.

Example 44 includes the subject matter of any one of Examples 41-43, wherein the destination MAC address further includes an encoded fabric identifier encoded therein.

Example 45 includes the subject matter of any one of Examples 41-44, wherein the Ethernet packet includes a payload, and wherein the payload comprises an Ethernet II frame.

Example 46 includes the subject matter of any one of Examples 45, wherein the Ethernet II frame comprises one of a user datagram protocol (UDP) frame or a transmission control protocol (TCP) frame.

Example 47 includes the subject matter of Example 45, wherein the Ethernet II frame comprises an IPv4 or IPv6 frame.

Example 48 includes the subject matter of Example 45, wherein the Ethernet packet comprises a multicast or unicast packet.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for exchanging Ethernet packets over a multi-node fabric comprising a plurality of communicatively coupled compute nodes each having at least one fabric interface circuit for communicating via the multi-node fabric, the method comprising:
   receiving, by a controller, a request to send an Ethernet packet from a process executed in user-space memory to a destination internet protocol (IP) address corresponding with a remote compute node within the plurality of communicatively coupled compute nodes;
   forming, by the controller, the Ethernet packet with a header including a destination media access control (MAC) address and a source MAC address;
   wherein the destination MAC address corresponds with the destination IP address and is encoded with a destination local identifier (LID) that identifies a fabric interface circuit of the remote compute node corresponding to the destination IP address; and
   wherein the source MAC address is encoded with a source LID that identifies a local fabric interface circuit associated with the controller;
   extracting, by the controller, the destination LID from the destination MAC address;
   encapsulating, by the controller, the Ethernet packet into a fabric-routable packet, wherein the fabric-routable packet includes a header portion comprising the extracted destination LID; and
   causing, by the controller, transmission of the fabric-routable packet to the remote compute node associated with the extracted destination LID via the multi-node fabric.

2. The method of claim 1, wherein the controller is implemented within a fabric interface circuit of at least one compute node of the plurality of communicatively coupled compute nodes.

3. The method of claim 1, wherein the destination MAC is a locally-administered MAC address.

4. The method of claim 1, wherein the header portion of the fabric-routable packet further includes the source LID.

5. The method of claim 1, wherein the destination MAC address further includes a virtual switch identifier encoded therein.

6. The method of claim 1, wherein the destination MAC address further includes a fabric identifier encoded therein.

7. The method of claim 1, wherein the Ethernet packet includes a payload, and wherein the payload comprises an Ethernet II frame.

8. The method of claim 1, wherein the Ethernet packet comprises a multicast or unicast packet.

9. A system comprising:
   a first node device comprising:
      a memory;
      circuitry configured to be communicatively coupled to a multi-node fabric comprising a plurality of communicatively coupled compute nodes, each of said plurality of communicatively coupled compute nodes comprising at least one fabric interface circuitry for communicating via the multi-node fabric, the circuitry being configured to:
      receive a request to send an Ethernet packet from a process executed in user-space memory to a destination internet protocol (IP) address corresponding with a remote compute node within the plurality of communicatively coupled compute nodes;
      form the Ethernet packet with a header including a destination media access control (MAC) address and a source MAC address;
      wherein the destination MAC address corresponds with the destination IP address and is encoded with a destination local identifier (LID) that identifies a fabric interface circuit of the remote compute node corresponding to the destination IP address; and
      wherein the source MAC address is encoded with a source LID that identifies a local fabric interface circuit associated with the controller;
      extract the destination LID from the destination MAC address;
      encapsulate the Ethernet packet into a fabric-routable packet, wherein the fabric-routable packet includes a header portion comprising the extracted destination LID; and
      cause the fabric-routable packet to be transmitted to the remote compute node associated with the extracted destination LID via the multi-node fabric.

10. The system of claim 9, wherein the circuitry of the first node device comprises a network interface circuit.

11. The system of claim 9, wherein the destination MAC is a locally-administered MAC address.

12. The system of claim 9, wherein the header portion of the fabric-routable packet further includes the source LID.

13. The system of claim 9, wherein the destination MAC address further includes an encoded virtual switch identifier encoded therein.

14. The system of claim 9, wherein the destination MAC address further includes an encoded fabric identifier encoded therein.

15. The system of claim 9, wherein the Ethernet packet includes a payload, and wherein the payload comprises an Ethernet II frame.

16. A non-transitory computer-readable medium having a plurality of instructions encoded thereon that when executed by at least one processor of a first node device that is communicatively coupled to a multi-node fabric comprising a plurality of communicatively coupled compute nodes, each of said plurality of communicatively coupled compute nodes comprising at least one fabric interface circuitry for communicating via the multi-node fabric, cause the first node device to perform the following operations comprising:
   receive a request to send an Ethernet packet from a process executed in user-space memory to a destination internet protocol (IP) address corresponding with a remote compute node within the plurality of communicatively coupled compute nodes;
   form the Ethernet packet with a header including a destination media access control (MAC) address and a source MAC address;
   wherein the destination MAC address corresponds with the destination IP address and is encoded with a destination local identifier (LID) that identifies a fabric interface circuit of the remote compute node corresponding to the destination IP address; and wherein the source MAC address is encoded with a source LID that identifies a local fabric interface circuit associated with the controller;

extract the destination LID from the destination MAC address;

encapsulate the Ethernet packet into a fabric-routable packet, wherein the fabric-routable packet includes a header portion comprising the extracted destination LID; and cause the fabric-routable packet to be transmitted to the remote compute node associated with the extracted destination LID via the multi-node fabric.

17. The computer-readable medium of claim 16, wherein the destination MAC is a locally-administered MAC address.

18. The computer-readable medium of claim 16, wherein the header portion of the fabric-routable packet further includes the source LID.

19. A system comprising:

a network interface circuit to:
communicatively couple to a multi-node fabric comprising a plurality of communicatively coupled compute nodes, each of said plurality of communicatively coupled compute nodes comprising at least one fabric interface circuitry for communicating via the multi-node fabric;
receive a request to send an Ethernet packet from a process executed in user-space memory to a destination internet protocol (IP) address corresponding with a remote compute node within the plurality of communicatively coupled compute nodes;
form the Ethernet packet with a header including a destination media access control (MAC) address and a source MAC address;
wherein the destination MAC address corresponds with the destination IP address and is encoded with a destination local identifier (LID) that identifies a fabric interface circuit of the remote compute node corresponding to the destination IP address; and
wherein the source MAC address is encoded with a source LID that identifies a local fabric interface circuit associated with the controller;

means for extracting the destination LID from the destination MAC address;

means for encapsulating the Ethernet packet into a fabric-routable packet, wherein the fabric-routable packet includes a header portion comprising the extracted destination LID; and wherein the network interface circuit is configured to transmit the fabric-routable packet to a remote node associated with the extracted destination LID via the multi-node fabric.

20. The system of claim 19, wherein the destination MAC is a locally-administered MAC address.

21. The system of claim 19, wherein the destination MAC address further includes at least one of an encoded virtual switch identifier encoded therein.

* * * * *